United States Patent
Huang et al.

(10) Patent No.: US 11,617,195 B2
(45) Date of Patent: Mar. 28, 2023

(54) METHOD AND APPARATUS FOR DOWNLINK CONTROL INFORMATION (DCI) CONTENT PROCESSING CONSIDERING ACTIVE DOWNLINK (DL) BANDWIDTH PART (BWP) CHANGE IN A WIRELESS COMMUNICATION SYSTEM

(71) Applicant: ASUSTek Computer Inc., Taipei (TW)

(72) Inventors: Chun-Wei Huang, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 259 days.

(21) Appl. No.: 16/395,712

(22) Filed: Apr. 26, 2019

(65) Prior Publication Data
US 2019/0342907 A1    Nov. 7, 2019

Related U.S. Application Data

(60) Provisional application No. 62/667,347, filed on May 4, 2018.

(51) Int. Cl.
*H04W 72/12* (2009.01)
*H04L 5/00* (2006.01)

(52) U.S. Cl.
CPC ....... *H04W 72/1289* (2013.01); *H04L 5/0048* (2013.01)

(58) Field of Classification Search
CPC ... H04L 5/0007; H04L 5/0048; H04L 5/0053; H04L 5/0091; H04W 72/1289
See application file for complete search history.

(56) References Cited

U.S. PATENT DOCUMENTS

2019/0140776 A1 * 5/2019 Seo ............... H04B 7/0695
2019/0297577 A1 * 9/2019 Lin ............... H04W 52/0219
(Continued)

FOREIGN PATENT DOCUMENTS

WO    WO-2019193666 A1 * 10/2019

OTHER PUBLICATIONS

WO 2019193666 A1; User Terminal and Wireless Base Station; Google Translated English Copy. (Year: 2018).*
(Continued)

*Primary Examiner* — Derrick W Ferris
*Assistant Examiner* — M Mostazir Rahman
(74) *Attorney, Agent, or Firm* — Skaar Ulbrich Macari, P.A.

(57) ABSTRACT

A method and apparatus are disclosed from the perspective of a User Equipment (UE). In one embodiment, the method includes the UE being configured with a first DL (Downlink) BWP (Bandwidth Part) and a second DL BWP. The method also includes the UE receiving and/or monitoring a DCI (Downlink Control Information) in a scheduling CORESET (Control Resource Set) in the first DL BWP, and for determining size of the DCI for decoding, the UE determines whether a TCI (Transmission Configuration Indication) field is present in the DCI or not based on a parameter of the scheduling CORESET before the UE decodes the DCI successfully. The method further includes the UE truncates or pads zero-bits to at least one field (other than the TCI field) in the DCI based on configuration of the second DL BWP after the UE decodes successfully the DCI, wherein a BWP indicator field in the DCI indicates the second DL BWP different from the first DL BWP. In addition, the method includes the UE determines whether the TCI field is present in the DCI or not based on the parameter of the scheduling CORESET in the first DL BWP after the UE
(Continued)

decodes successfully the DCI, wherein a BWP indicator field in the DCI indicates the second DL BWP different from the first DL BWP.

20 Claims, 8 Drawing Sheets

(56) References Cited

U.S. PATENT DOCUMENTS

| | | | |
|---|---|---|---|
| 2020/0267571 A1* | 8/2020 | Park | H04W 72/046 |
| 2020/0374060 A1* | 11/2020 | Wang | H04W 72/042 |
| 2021/0051667 A1* | 2/2021 | Yang | H04W 72/0446 |
| 2021/0084623 A1* | 3/2021 | Zhang | H04W 72/042 |

OTHER PUBLICATIONS

Office Action from Intellectual Property India in corresponding IN Application No. 201914016678, dated Oct. 30, 2020.

Interdigital, Inc., "Remaining issues on dynamic BWP switching", 3GPP TSG RAN WG1 Meeting #92bis, Sanya, China, Apr. 16-20, 2018, R1-1804674.

3rd Generation Partnership Project; Technical Specification Group Radio Access Network, NR, Physical Layer Procedures for Control, 3GPP TS 38.213 V15.1.0 (Mar. 2018).

Interdigital et al: "Remaining issues on dynamic BWP switching", 3GPP Draft; R1-1804674 (R15 NR WI AI 71341 Details of BWP Switching Operation), 3rd Generation Partnership Project (3GPP), Mobile Competence Centre ; 650, Route Des Lucioles ; F-06921 Sophia-Antipolis vol. RAN WG1, No. Sanya, China; Apr. 16, 2018-Apr. 20, 2018 Apr. 15, 2018 (Apr. 15, 2018).

3rd Generation Partnership Project; Technical Specification Group Radio Access Network; NR; Physical layer procedures for control (Release 15), 3GPP Draft; R1-1801293, 650, Route Des Lucioles ; F-06921 Sophia-Antipolis Cedex ; France Feb. 12, 2018 (Feb. 12, 2018), XP051398860.

European Search Report in corresponding EP Application No. 19171312.2, dated Sep. 4, 2019.

3GPP TSG RAN WG1 Meeting #92bis R1-1804674 Sanya, China, Apr. 16-20, 2018.

3GPP TS 38.213 V15.1.0; Technical Specification Group Radio Access Network; NR; Physical layer procedures for control (Release 15) Apr. 8, 2018.

Office Action from Taiwan Intellectual Patent Office in corresponding CN Application No. 108114738, dated Mar. 12.

* cited by examiner

METHOD AND APPARATUS FOR DOWNLINK CONTROL INFORMATION (DCI) CONTENT PROCESSING CONSIDERING ACTIVE DOWNLINK (DL) BANDWIDTH PART (BWP) CHANGE IN A WIRELESS COMMUNICATION SYSTEM

CROSS-REFERENCE TO RELATED APPLICATIONS

The present application claims the benefit of U.S. Provisional Patent Application Ser. No. 62/667,347 filed on May 4, 2018, the entire disclosure of which is incorporated herein in its entirety by reference.

FIELD

This disclosure generally relates to wireless communication networks, and more particularly, to a method and apparatus for DCI content processing considering active DL BWP change in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes the UE being configured with a first DL (Downlink) BWP (Bandwidth Part) and a second DL BWP. The method also includes the UE receiving and/or monitoring a DCI (Downlink Control Information) in a scheduling CORESET (Control Resource Set) in the first DL BWP, and for determining size of the DCI for decoding, the UE determines whether a TCI (Transmission Configuration Indication) field is present in the DCI or not based on a parameter of the scheduling CORESET before the UE decodes the DCI successfully. The method further includes the UE truncates or pads zero-bits to at least one field (other than the TCI field) in the DCI based on configuration of the second DL BWP after the UE decodes successfully the DCI, wherein a BWP indicator field in the DCI indicates the second DL BWP different from the first DL BWP. In addition, the method includes the UE determines whether the TCI field is present in the DCI or not based on the parameter of the scheduling CORESET in the first DL BWP after the UE decodes successfully the DCI, wherein a BWP indicator field in the DCI indicates the second DL BWP different from the first DL BWP.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: Final Report of 3GPP TSG RAN WG1 #85 v1.0.0 (Nanjing, China, 23-27 May 2016); Final Report of 3GPP TSG RAN WG1 #86 v1.0.0 (Gothenburg, Sweden, 22-26 Aug. 2016); Final Report of 3GPP TSG RAN WG1 #86bis v1.0.0 (Lisbon, Portugal, 10-14 Oct. 2016); Final Report of 3GPP TSG RAN WG1 #87 v1.0.0 (Reno, USA, 14-18 Nov. 2016); Final Report of 3GPP TSG RAN WG1 #AH1_NR v1.0.0 (Spokane, USA, 16-20 Jan. 2017); Final Report of 3GPP TSG RAN WG1 #88 v1.0.0 (Athens, Greece, 13-17 Feb. 2017); Final Report of 3GPP TSG RAN WG1 #88bis v1.0.0 (Spokane, USA, 3-7 Apr. 2017); Final Report of 3GPP TSG RAN WG1 #89 v1.0.0 (Hangzhou, China, 15-19 May 2017); Final Report of 3GPP TSG RAN WG1 #AH_NR2 v1.0.0 (Qingdao, China, 27-30 Jun. 2017); Final Report of 3GPP TSG RAN WG1 Meeting #90 (Prague, Czech Republic, 21-25 Aug. 2017); Final Report of 3GPP TSG RAN WG1 Meeting #AH_NR3 (Nagoya, Japan, 18-21 Sep. 2017); Final Report of 3GPP TSG RAN WG1 Meeting #90bis (Prague, Czech Republic, 9-13 Oct. 2017); Final Report of 3GPP TSG RAN WG1 Meeting #91 (Reno, USA, 27 Nov.-1 Dec. 2017); Final Report of 3GPP TSG RAN WG1 #AH1_1801 v1.0.0 (Vancouver, Canada, 22-26 Jan. 2018); Draft Report of 3GPP TSG RAN WG1 Meeting #92 v0.2.0 (Athens, Greece, 26 Feb.-2 Mar. 2018); and Final Report of 3GPP TSG RAN WG1 #92bis; TS 38.212 V15.1.0, "Multiplexing and channel coding (Release 15)"; TS 38.213 V15.1.0, "Physical layer procedures for control (Release 15)"; and TS 38.214 V15.1.0, "Physical layer procedures for data (Release 15)". The standards and documents listed above are hereby expressly incorporated by reference in their entirety.

Figure 1:
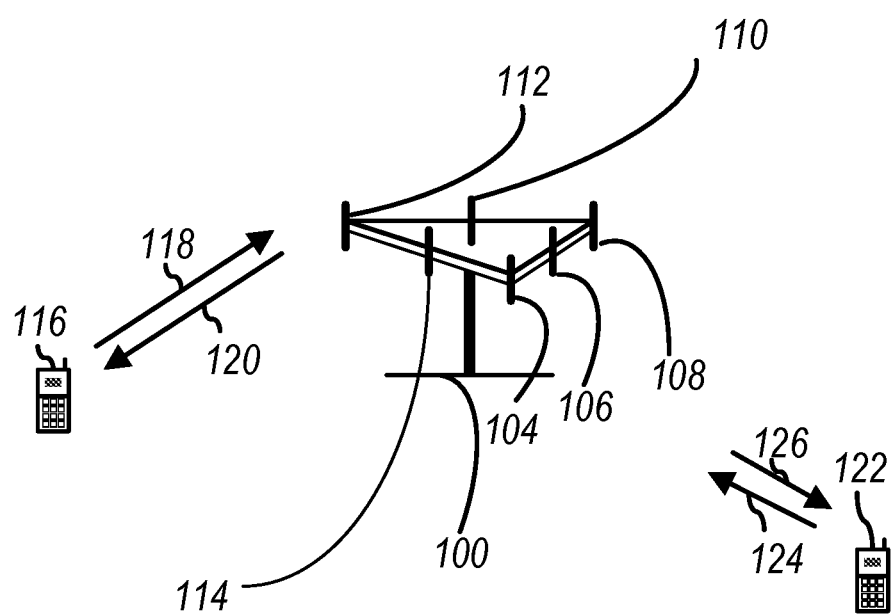
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as a network (NW), an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
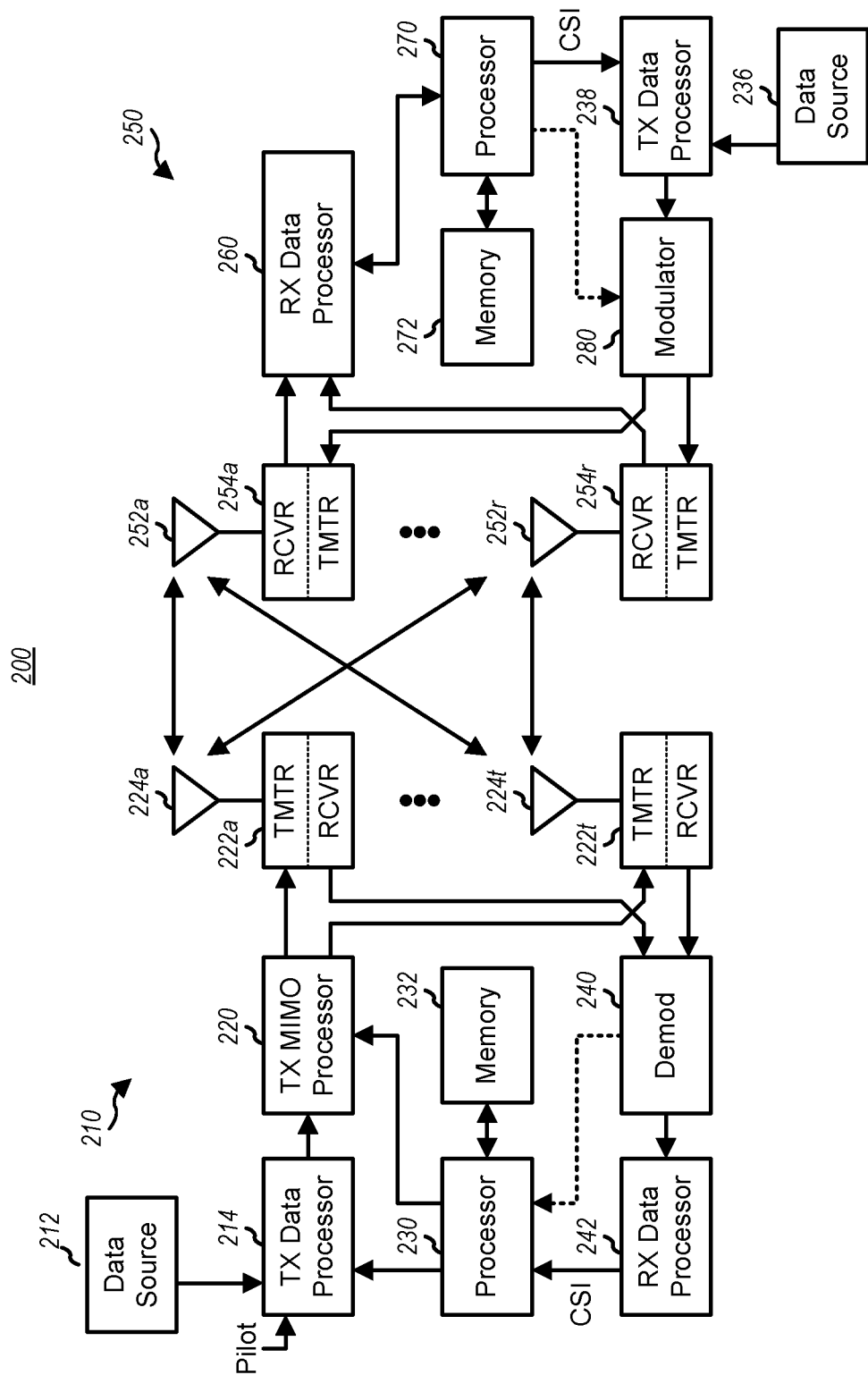
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
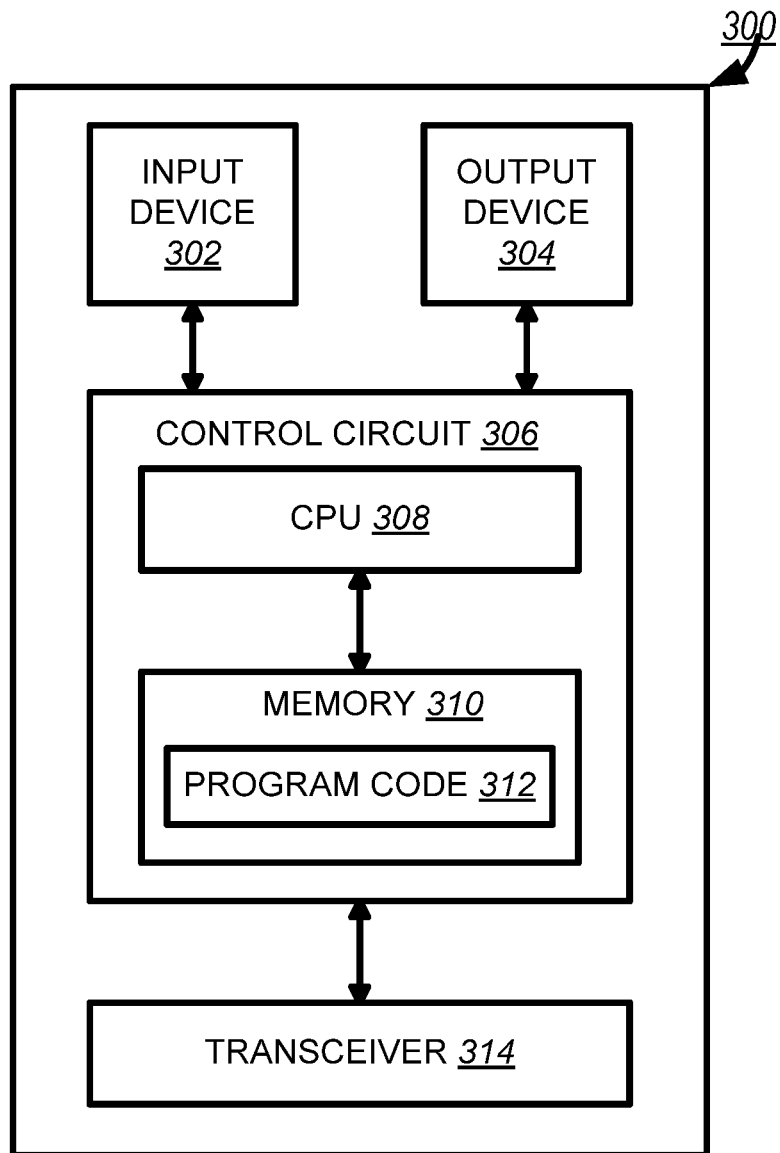
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
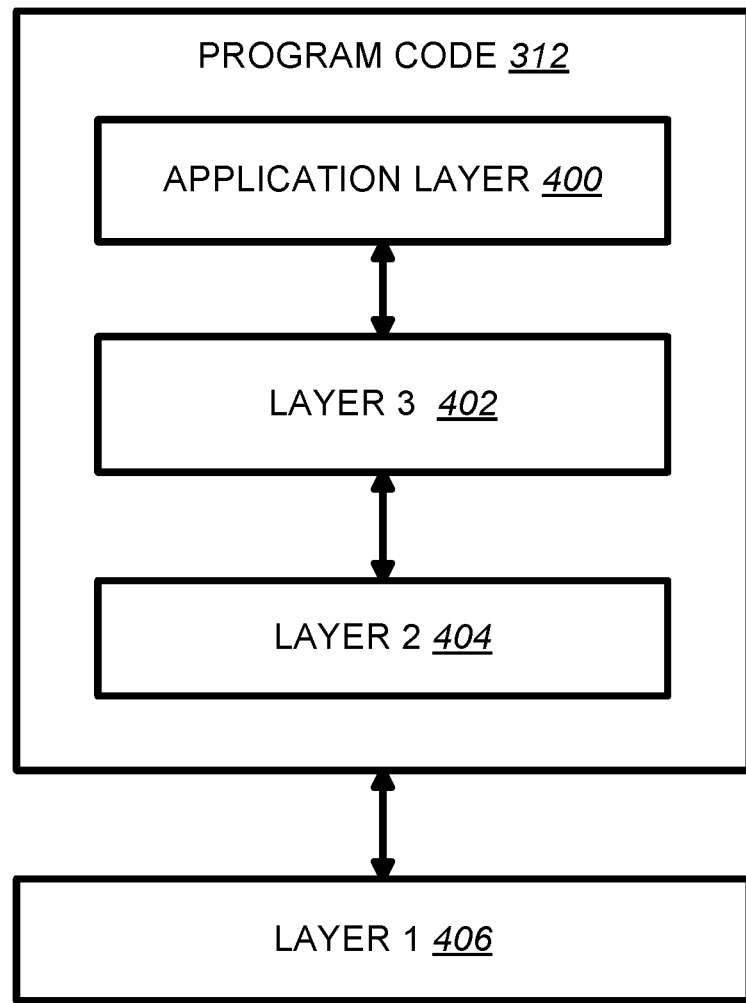
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

There are some agreements on beam management in RAN1 #85 meeting, as described in the Final Report of 3GPP TSG RAN WG1 #85 v1.0.0 (Nanjing, China, 23-27 May 2016) as follows:

Agreements:
  Following three implementations of beamforming are to be studied in NR
    Analog beamforming
    Digital beamforming
    Hybrid beamforming
    Note: The physical layer procedure design for NR can be agnostic to UE/TRP with respect to the beamforming implementations employed at TRP/UE, but it may pursue beamforming implementation specific optimization not to lose efficiency
  RAN1 studies both multi-beam based approaches and single-beam based approaches for these channels/signals/measurement/feedback
    Initial-access signals (synchronization signals and random access channels)
    System-information delivery
    RRM measurement/feedback
    L1 control channel
    Others are FFS
    Note: The physical layer procedure design for NR can be unified as much as possible whether multi-beam or single-beam based approaches are employed at TRP at least for synchronization signal detection in stand-alone initial access procedure
    Note: single beam approach can be a special case of multi beam approach
    Note: Individual optimization of single beam approach and multiple beam approach is possible
  Multi-beam based approaches
    In Multi-beam based approaches, multiple beams are used for covering a DL coverage area and/or UL coverage distance of a TRP/a UE
    One example of multi-beam based approaches is beam sweeping:
      When beam sweeping is applied for a signal (or a channel), the signal (the channel) is transmitted/received on multiple beams, which are on multiple time instances in finite time duration
      Single/multiple beam can be transmitted/received in a single time instance
    Others are FFS
  Single-beam based approaches
    In single-beam based approaches, the single beam can be used for covering a DL coverage area and/or UL coverage distance of a TRP/a UE, similarly as for LTE cell-specific channels/RS
  For both single-beam and multi-beam based approaches, RAN1 can consider followings in addition
    Power boosting
    SFN
    Repetition
    Beam diversity (only for multi-beam approach)
    Antenna diversity
    Other approaches are not precluded
  Combinations of single-beam based and multi-beam based approaches are not precluded
Agreement: Study the necessity of QCL and measurement assumptions for antenna ports in NR There are some agreements on beam management in RAN1 #86 meeting, as described in the Final Report of 3GPP TSG RAN WG1 #86 v1.0.0 (Gothenburg, Sweden, 22-26 Aug. 2016) as follows:

Agreements:
  The following DL L1/L2 beam management procedures are supported within one or multiple TRPs:
    P-1: is used to enable UE measurement on different TRP Tx beams to support selection of TRP Tx beams/UE Rx beam(s)
      For beamforming at TRP, it typically includes a intra/inter-TRP Tx beam sweep from a set of different beams
      For beamforming at UE, it typically includes a UE Rx beam sweep from a set of different beams
      FFS: TRP Tx beam and UE Rx beam can be determined jointly or sequentially
    P-2: is used to enable UE measurement on different TRP Tx beams to possibly change inter/intra-TRP Tx beam(s)
      From a possibly smaller set of beams for beam refinement than in P-1
      Note: P-2 can be a special case of P-1
    P-3: is used to enable UE measurement on the same TRP Tx beam to change UE Rx beam in the case UE uses beamforming
    Strive for the same procedure design for Intra-TRP and inter-TRP beam management
      Note: UE may not know whether it is intra-TRP or inter TRP beam
    Note: Procedures P-2&P-3 can be performed jointly and/or multiple times to achieve e.g. TRP Tx/UE Rx beam change simultaneously
    Note: Procedures P-3 may or may not have physical layer procedure spec. impact
  Support managing multiple Tx/Rx beam pairs for a UE
    Note: Assistance information from another carrier can be studied in beam management procedures Note that above procedure can be applied to any frequency band Note that above procedure can be used in single/multiple beam(s) per TRP Note: multi/single beam based initial access and mobility treated within a separate RAN1 agenda item R1-168468 Definitions supporting beam related procedures Nokia, Qualcomm, CATT, Intel, NTT DoCoMo, Mediatek, Ericsson, ASB, Samsung, LGE {
  [1] Beam management = a set of L1/L2 procedures to acquire and maintain a set of TRP(s) and/or UE beams that can be used for DL and UL transmission/reception, which include at least following aspects:
    Beam determination= for TRP(s) or UE to select of its own Tx/Rx beam(s).
    Beam measurement = for TRP(s) or UE to measure characteristics of received beamformed signals
    Beam reporting = for UE to report information a property/quality of of beamformed signal(s) based on beam measurement
    Beam sweeping = operation of covering a spatial area, with beams transmitted and/or received during a time interval in a predetermined way.
}

There are some agreements on beam management in RAN1 #86bis meeting, as described in the Final Report of 3GPP TSG RAN WG1 #86bis v1.0.0 (Lisbon, Portugal, 10-14 Oct. 2016) as follows:

Agreements:
  For downlink, NR supports beam management with and without beam-related indication
    When beam-related indication is provided, information pertaining to UE-side beamforming/receiving procedure used for data reception can be indicated through QCL to UE
      FFS: Information other than QCL
    FFS: When beam-related indication is provided, information pertaining to the Tx beam used for data transmission is indicated to UE Agreements:
  Support using same or different beams on control channel and the corresponding data channel transmissions
  [ . . . ]
[ . . . ]

Working assumption:
  The followings are defined as Tx/Rx beam correspondence at TRP and UE:
  Tx/Rx beam correspondence at TRP holds if at least one of the following is satisfied:
    TRP is able to determine a TRP Rx beam for the uplink reception based on UE's downlink measurement on TRP's one or more Tx beams.
    TRP is able to determine a TRP Tx beam for the downlink transmission based on TRP's uplink measurement on TRP's one or more Rx beams
  Tx/Rx beam correspondence at UE holds if at least one of the following is satisfied:
    UE is able to determine a UE Tx beam for the uplink transmission based on UE's downlink measurement on UE's one or more Rx beams.
    UE is able to determine a UE Rx beam for the downlink reception based on TRP's indication based on uplink measurement on UE's one or more Tx beams.
  More refined definition can still be discussed There are some agreements on beam management in RAN1 #87 meeting, as described in the Final Report of 3GPP TSG RAN WG1 #87 v1.0.0 (Reno, USA, 14-18 Nov. 2016) as follows:

Agreements:
  NR supports with and without a downlink indication to derive QCL assumption for assisting UE-side beamforming for downlink control channel reception
  [ . . . ]

There are some agreements on beam management in RAN1 #AH1_NR meeting, as described in the Final Report of 3GPP TSG RAN WG1 #AH1_NR v1.0.0 (Spokane, USA, 16-20 Jan. 2017) as follows:

Agreements (further to offline):
  NR-PDCCH transmission supports robustness against beam pair link blocking
    UE can be configured to monitor NR-PDCCH on M beam pair links simultaneously, where
      M≥1. Maximum value of M may depend at least on UE capability.
      FFS: UE may choose at least one beam out of M for NR-PDCCH reception
    UE can be configured to monitor NR-PDCCH on different beam pair link(s) in different NR-PDCCH OFDM symbols
    [ . . . ]
  [ . . . ]
  Parameters related to UE Rx beam setting for monitoring NR-PDCCH on multiple beam pair links are configured by higher layer signaling or MAC CE and/or considered in the search space design
  [ . . . ]

Agreement:
  For the definition of beam correspondence:
    Confirm the previous working assumption of the definition
      Note: this definition/terminology is for convenience of discussion
  [ . . . ]

Agreement:
  Support capability indication of UE beam correspondence related information to TRP
  [ . . . ]

Agreements:
  For reception of DL control channel, support indication of spatial QCL assumption between an DL RS antenna port(s), and DL RS antenna port(s) for demodulation of DL control channel
  [ . . . ]
  For reception of DL data channel, support indication of spatial QCL assumption between DL RS antenna port(s) and DMRS antenna port(s) of DL data channel
  [ . . . ]
  Different set of DMRS antenna port(s) for the DL data channel can be indicated as QCL with different set of RS antenna port(s)

Option 1: Information indicating the RS antenna port(s) is indicated via DCI
  FFS: whether the information indicating the RS antenna port(s) will be assumed only for the scheduled "PDSCH" or until the next indication
Option 2: Information indicating the RS antenna port(s) is indicated via MAC-CE, and will be assumed until the next indication
Option 3: Information indicating the RS antenna port(s) is indicated via a combination of MAC CE and DCI
At least one option is supported
  [ . . . ]
  [ . . . ]
  [ . . . ]

There are some agreements on beam management in RAN1 #88 meeting, as described in the Final Report of 3GPP TSG RAN WG1 #88 v1.0.0 (Athens, Greece, 13-17 Feb. 2017) as follows:

Agreements:
  For reception of unicast DL data channel, support indication of spatial QCL assumption between DL RS antenna port(s) and DMRS antenna port(s) of DL data channel: Information indicating the RS antenna port(s) is indicated via DCI (downlink grants)
    The information indicates the RS antenna port(s) which is QCL-ed with DMRS antenna port(s)
      FFS: Indication details
        E.g. explicit indication of RS port/resource ID, or implicitly derived
  [ . . . ]
    Note: related signalling is UE-specific
  [ . . . ]
  Candidate signalling methods for beam indication for a NR-PDCCH (i.e. configuration method to monitor NR-PDCCH)
    MAC CE signalling
    RRC signalling
    DCI signalling
    Spec-transparent and/or implicit method
    Combination of the above There are some agreements on beam management in RAN1 #88bis meeting, as described in the Final Report of 3GPP TSG RAN WG1 #88bis v1.0.0 (Spokane, USA, 3-7 Apr. 2017) as follows:

Agreements:
  For UE RRC connected mode, periodic signal is supported at least for P1 procedure (Tx/Rx beam alignment) using following options in addition to UE-specifically configured CSI-RS. Down selection from following options will be conducted in the next meeting.
    Opt. 1: SS blocks
    Opt. 2: Cell-specifically configured CSI-RS
      Configuration of CSI-RS is obtained from the broadcast message (e.g., MIB, SIB)
    Opt. 3: No additional option Agreements:
  Aim for low-overhead indication for spatial QCL assumption to assist UE-side beamforming/receiving
    FFS details (e.g., tag-based where the tag refers to previous CSI-RS resources, BPL-based, referring to previous measurement reports, indication one resource (set) out of multiple resource (set)s configured by RRC, CSI-RS resource/port index based, etc.)

Agreements:
  For reception of DL data channel, study further at least the following:
    Whether or not have an effective window of spatial QCL assumption
    Interaction between higher layer signaling (if supported) and DCI indication
      FFS the signaling details for higher layer and DCI based approaches (e.g., the corresponding information field in DCI, etc.)
    Interaction between beam management and PDSCH transmission
    Whether or not to have a default behavior (e.g., due to DCI miss detection), and if so the default behavior
    Beam switching time, DCI decoding time, etc.

There are some agreements on beam management in RAN1 #89 meeting, as described in the Final Report of 3GPP TSG RAN WG1 #89 v1.0.0 (Hangzhou, China, 15-19 May 2017) as follows:

Agreements:
  Support spatial QCL assumption between antenna port(s) within a CSI-RS resource(s) and antenna port of an SS Block (or SS block time index) of a cell
    The other QCL parameters not precluded
  [ . . . ]
    Note: default assumption may be no QCL
  Configuration of QCL for UE specific NR-PDCCH is by RRC and MAC-CE signalling
    Note that MAC-CE is not always needed
  [ . . . ]
    Note: For example, DL RS QCLed with DMRS of PDCCH for delay spread, Doppler spread, Doppler shift, and average delay parameters, spatial parameters Agreements:
  NR supports CSI-RS configuration to support Tx and/or Rx beam sweeping for beam management conveying at least the following information
    Information related to CSI-RS resource configuration
      E.g., CSI-RS RE pattern, number of CSI-RS antenna ports, CSI-RS periodicity (if applicable) etc.
    Information related to number of CSI-RS resources
    Information related to number of time-domain repetitions (if any) associated with each CSI-RS resource
      FFS: details of time-domain repetitions, e.g., signaling for time-domain repetitions may not be explicit
  [ . . . ]
    Note this does not imply particular option (IFDMA or subcarrier scaling or DFT based) for sub time unit partition
  [ . . . ]

There are some agreements on beam management in RAN1 #AH_NR2 meeting, as described in the Final Report of 3GPP TSG RAN WG1 #AH_NR2 v1.0.0 (Qingdao, China, 27-30 Jun. 2017) as follows:

Agreements:
  RAN1 to study the relation (if any) between a measurement and/or reporting on a reference signal and a subsequent beam indication for beam management purposes
  [ . . . ]

Study L1-RSRP reporting of multiple beams considering
Differential L1-RSRP for multiple beams
Reference RSRP for L1-RSRP differential report,
e.g., predefined or configurable
Bit-width of reporting,
Number of groups/beams per group
UCI design of the beam reporting,
[ . . . ]

There are some agreements on beam management in RAN1 #90 meeting, as described in the Final Report of 3GPP TSG RAN WG1 Meeting #90 v1.0.0 (Prague, Czech Rep, 21-25 Aug. 2017) as discussed below. One agreement is related to beam indication of unicast PDSCH which is indicated in a DCI.

Agreements:
In addition to periodic CSI-RS, SS-block within the serving cell can be used for new candidate beam identification
The following options can be configured for new candidate beam identification
CSI-RS only
Note: in this case, SSB will not be configured for new candidate beam identification
SS block only
Note: in this case, CSI-RS will not be configured for new candidate beam identification
FFS: CSI-RS+SS block There are some agreements on beam management in RAN1 #AH_NR3 meeting, as described in the Final Report of 3GPP TSG RAN WG1 Meeting #AH_NR3 (Nagoya, Japan, 18-21 Sep. 2017) as follows:

Agreement:
A UE is RRC configured with a list of up to M candidate Transmission Configuration Indication (TCI) states at least for the purposes of QCL indication
Whether M equal to or larger than $2^N$ is for further study, where N is the size of the DCI field for PDSCH
FFS: Mapping between the candidate states to the states described by N bit DCI field for PDSCH
Each TCI state can be configured with one RS Set
Each ID (FFS: details of ID) of DL RS at least for the purpose of spatial QCL in an RS Set can refer to one of the following DL RS types:
SSB
Periodic CSI-RS
Aperiodic CSI-RS
Semi-persistent CSI-RS
FFS: Other RS (e.g. TRS, PTRS) in an RS set depending on outcome of discussions in the QCL agenda item
FFS: Mechanisms to initialize/update the ID of a DL RS(s) in the RS Set used at least for spatial QCL purposes
At least the following two mechanisms are FFS: (1) explicit signalling to the UE of the DL RS(s) ID and corresponding TCI state (2) implicit association of the DL RS ID(s) to a TCI state based on measurements by the UE.
The mechanisms used for different RS types are FFS
FFS: Whether or not a TCI state includes other parameters(s), e.g., for PDSCH rate matching purposes
FFS: Value of N, where N is at most [3] bits
Note: More details on specification of more than one DMRS port group and more than one RS Set per TCI state is to be completed after the December release.

Agreement:
The QCL configuration for PDCCH contains the information which provides a reference to a TCI state
Alt 1: The QCL configuration/indication is on a per CORESET basis
The UE applies the QCL assumption on the associated CORESET monitoring occasions. All search space(s) within the CORESET utilize the same QCL.
Alt 2: The QCL configuration/indication is on a per search space basis
The UE applies the QCL assumption on an associated search space. This could mean that in the case where there are multiple search spaces within a CORESET, the UE may be configured with different QCL assumptions for different search spaces.
Note: The indication of QCL configuration is done by RRC or RRC+MAC CE (FFS: by DCI) Note: The above options are provided as input to the control channel agenda item discussion Agreement:
For QCL indication for PDSCH:
When TCI states are used for QCL indication, the UE receives an N-bit TCI field in DCI
The UE assumes that the PDSCH DMRS is QCL with the DL RS(s) in the RS Set corresponding to the signaled TCI state
FFS: whether or not a QCL type is configured, configuration details are for further study
Whether or not the TCI field is always present in a given DL-related DCI is FFS
FFS: Whether or not the TCI field is in the same DCI as that containing the PDSCH scheduling assignment
FFS: Timing between when the UE receives a QCL configuration/indication and the first time that the QCL assumption may be applied for demodulation of PDSCH or PDCCH There are some agreements on beam management in RAN1 #90bis meeting, as described in the Final Report of 3GPP TSG RAN WG1 Meeting #90bis v1.0.0 (Prague, Czech Republic, 9-13 Oct. 2017) as follows:

Agreement:
Support at least the explicit approach for the update of spatial QCL reference in a TCI state.
FFS: Additional support for implicit update.
Note: In the explicit approach, the TCI state is updated using either RRC or RRC+MAC-CE based approach
Note: In the implicit approach, when a set of aperiodic CSI-RS resources are triggered, the triggering DCI includes a TCI state index which provides spatial QCL reference for the triggered set of CSI-RS resources. Following the measurement, the spatial QCL reference in the RS set corresponding to the indicated TCI state is updated based on the preferred CSI-RS determined by the UE. Other operations of implicit approaches are not precluded.

Agreement:
NR adopts the SRS Tx beam indication, i.e., by a SRS resource or by a DL RS
The DL RS supported at least include CSI-RS and SSB.
NR supports the indication of at least the spatial relations between the DL RS and the UL SRS Tx beam via at least the following mechanisms.

| Spatial parameter | Reference RS | Target RS | Signalling mode |
|---|---|---|---|
| Spatial | SSB/CSI-RS (at least P-CSIRS and SP-CSI-RS), P-SRS FFS: AP-CSI-RS, SP-SRS | P SRS | RRC |
| Spatial | SSB/CSI-RS(at least P-CSIRS and SP-CSI-RS), P-SRS/ FFS:AP-SRS, AP-CSI-RS | SP-SRS SP-SRS | RRC + MAC-CE |
| Spatial | SSB/CSI-RS (at least P-CSIRS and SP-CSI-RS), P-SRS, SP-SRS, AP-SRS Working assumption: AP-CSI-RS | AP SRS | RRC or RRC + MAC CE for configuration, indication with DCI |

FFS: The use of spatial relation across CCs and/or BWPs.

There are some agreements on beam management in RAN1 #91 meeting, as described in the Final Report of 3GPP TSG RAN WG1 Meeting #91 v1.0.0 (Reno, USA, 27 Nov.-1 Dec. 2017) as follows:
Agreement:
Mechanism to indication of source QCL for a resource:
  P-CSI-RS—through RRC configuration
    FFS: If the spatial QCL can be configured through a reference to a configured TCI state
  SP-CSI-RS—configuring the resource(s) through RRC, activation/deactivation through MAC-CE;
    The QCL for SP-CSI-RS is indicated in the same MAC-CE message that activates the SP-CSI-RS.
    The QCL is provided through an association with one of the M candidate TCI states
  AP-CSI-RS—
    Through DCI (AP-CSI-report-triggering state indication)
      For each AP-CSI-RS resource associated with each triggering state, QCL configuration is provided through an association with one of the M candidate TCI states by RRC
      FFS: Value of M
      FFS: TCI association on NZP-CSI-RS/ZP-CSI-RS based IMR
Agreement:
  The state Is-TCI-Present is configured on a per-CORESET basis
  For beam management with beam indication, on all CORESETs configured with Is-TCI-Present=false, the TCI state used for PDCCH is reused for PDSCH reception
Agreement:
  A candidate set of DL RSs are configured using RRC mechanism
    Each state of M TCI states is RRC configured with a downlink RS set used as a QCL reference, and MAC-CE is used to select up to 2^N TCI states out of M for PDSCH QCL indication
    The same set of M TCI states are reused for CORESET
    K TCI states are configured per CORESET
    When K>1, MAC CE can indicate which one TCI state to use for control channel QCL indication
    When K=1, no additional MAC CE signaling is necessary
Agreement:
  When the scheduling offset is <=k, the PDSCH uses QCL assumption that is based on a default TCI state (e.g. the first state of the 2^N states used for PDSCH QCL indication)
Agreement
  Between initial RRC configuration and MAC CE activation of TCI states, the UE may assume that both PDCCH and PDSCH DMRS are spatially QCL-ed with the SSB determined during initial access
Agreement:
  When the scheduling offset is <=k, and the PDSCH uses QCL assumption that is based on a default TCI state
    The default TCI state corresponds to the TCI state used for control channel QCL indication for the lowest CORESET ID in that slot
There are some agreements on beam management in RAN1 #AH_1801 meeting, as described in the Final Report of 3GPP TSG RAN WG1 Meeting #AH_1801 v1.0.0 (Vancouver, Canada, 22-26 Jan. 2018) as follows:
Agreement:
  Maximum number of candidate TCI states is M_max. Down-select to one of the following two alternatives:
    Alt-1: M_max=64
      Note that the value M_max is for configuration of TCI states only
  Relationship between RRC configuration of TCI states and bandwidth parts is decided by RAN2
Include as part of LS to RAN2
Agreement:
  QCL source for a target semi-persistent CSI-RS resource set is provided by TCI states in the same MAC-CE at resource level
  Include as part of LS to RAN2
[ . . . ]
Agreement:
  Maximum number of candidate TCI states configured for a CORESET is K_max
    K_max=M
      Note that the value M is for configuration of TCI states only
      Note: UE is not expected to track the K configured TCI states. The value of K is for configuration of TCI states only.
[ . . . ]
Draft LS is endorsed in R1-1801272 with the following changes:
------start------
7. Latency of the MAC-CE Messages
RAN1 discussed about specification support of application timing of MAC-CE. To avoid ambiguity during the transition, RAN1 kindly asks RAN2's opinion about following candidates of latency values of MAC-CE indication. These are candidate values that RAN1 is considering:
  Downlink-related:
    Time between the ACK transmission for the PDSCH carrying the MAC-CE message and the time that the UE applies the MAC-CE message. Note some of the MAC CE messages may carry QCL information. Following is based on assumption of 120 kHz SCS for slot duration. RAN1 will down select a single value per SCS among the following candidate values, which may be based on UE capability.
    For PDSCH
      Candidate values (slots): 8, 10, 20, 40, 80 (considering the minimum 10 ms periodicity for TRS in case of 80 slots)
    For PDCCH:
      Candidate values (slots): 8, 10, 20, 40, 80
    For SP-CSI-RS:
      Candidate values (slots): 8, 10, 20, 40, 80

For aperiodic CSI trigger state subselection:
  Candidate values (slots): 8, 10, 20, 40, 80
Uplink-related:
  Time between the ACK transmission for the PDSCH carrying the MAC-CE activation message and the time that the UE applies the MAC-CE message. Following is based on assumption of 120 kHz SCS for slot duration. RAN1 will down select a single value per SCS among the following candidate values, which may be based on UE capability.
  For semi-persistent SRS:
    Candidate values (slots): 8, 10, 20, 40, 80
  For semi-persistent CSI reporting (on PUCCH):
    Candidate values (slots): 8, 10, 20, 40, 80
  For PUCCH-SpatialRelationInfo:
    Candidate values (slots): 8, 10, 20, 40, 80
------end------

There are some agreements on beam management in RAN1 #92 meeting, as described in the Draft Report of 3GPP TSG RAN WG1 Meeting #92 v0.2.0 (Athens, Greece, 26-2 Mar. 2018) as follows:

Agreement:
If all configured TCI states do NOT contain QCL Type D i.e. QCL w.r.t. spatial Rx parameter, a UE shall obtain the other QCL assumptions from the indicated TCI state for its scheduled PDSCH irrespective of the time offset between the reception of the DL DCI and the corresponding PDSCH Agreement (RRC parameter update):
As previously agreed, maximum number of TCI states in TCI-StatesPDCCH is the same as in TCI-States, i.e., 64. Update to 38.331: maxNrofTCI-StatesPDCCH=64.

Agreement (RRC parameter update):
As previously agreed, maximum number of TCI states is 64. Hence, the ID range is 0 . . . 63. Update to 38.331: TCI-StateId=0 . . . 63.

Agreement (RRC parameter update):
Update to 38.331: Size of list qcl-Info-aPeriodicReportingTrigger is maxNrofReportConfigIdsPerTrigger*maxNrofAP-CSI-RS-ResourcesPerSet Agreement:
UE expects a dedicated SearchSpace configuration that is one-to-one mapped to CORESET-BFR (RRC parameter CORESET-BFR remains)

There are some agreements on beam management in RAN1 #92bis meeting, as described in the Final Report of 3GPP TSG RAN WG1 Meeting #92bis as follows:

Agreement
For the case of single CC case, to determine the "lowest CORESET-ID" for determining default spatial QCL assumption for PDSCH, only consider CORESETs in active BWP Agreement
The latency for MAC CE activation is 12 slots for 60 kHz SCS and 24 slots for 120 kHz SCS. The latency is calculated from the ending symbol of UE's ACK transmission for PDSCH carrying MAC-CE activation message to when the MAC CE message is applied.

3GPP TS 38.212 V15.1.0 provides some descriptions related to beam indication, BWP, and DCI contents as follows:
7.3.1.2 DCI Formats for Scheduling of PDSCH
7.3.1.2.1 Format 1_0
DCI format 1_0 is used for the scheduling of PDSCH in one DL cell.
The following information is transmitted by means of the DCI format 1_0 with CRC scrambled by C-RNTI:
  Identifier for DCI formats—1 bits
    The value of this bit field is always set to 1, indicating a DL DCI format
  Frequency domain resource assignment—$\lceil \log_2 (N_{RB}^{DL,BWP}(N_{RB}^{DL,BWP}+1)/2) \rceil$ bits
    $N_{RB}^{DL,BWP}$ is the size of the initial bandwidth part in case DCI format 1_0 is monitored in the common search space
    $N_{RB}^{DL,BWP}$ is the size of the active bandwidth part in case DCI format 1_0 is monitored in the UE specific search space and satisfying
      the total number of different DCI sizes monitored per slot is no more than 4, and
      the total number of different DCI sizes with C-RNTI monitored per slot is no more than 3
  Time domain resource assignment—X bits as defined in Subclause 5.1.2.1 of [6, TS 38.214]
  VRB-to-PRB mapping—1 bit according to Table 7.3.1.1.2-33
  Modulation and coding scheme—5 bits as defined in Subclause 5.1.3 of [6, TS 38.214]
  New data indicator—1 bit
  Redundancy version—2 bits as defined in Table 7.3.1.1.1-2
  HARQ process number—4 bits
  Downlink assignment index—2 bits as defined in Subclause 9.1.3 of [5, TS 38.213], as counter DAI
  TPC command for scheduled PUCCH—[2] bits as defined in Subclause 7.2.1 of [5, TS 38.213]
  PUCCH resource indicator—3 bits as defined in Subclause 9.2.3 of [5, TS 38.213]
  PDSCH-to-HARQ_feedback timing indicator—[3] bits as defined in Subclause x.x of [5, TS38.213]
The following information is transmitted by means of the DCI format 1_0 with CRC scrambled by P-RNTI:
  Short Messages Indicator—1 bit. This bit is used to indicate whether the short message only or scheduling information only is carried in the Paging DCI.
The following information is transmitted by means of the DCI format 1_0 with CRC scrambled by SI-RNTI:
  XXX—x bit
The following information is transmitted by means of the DCI format 1_0 with CRC scrambled by RA-RNTI:
  Identifier for DCI formats—1 bit, reserved
  Frequency domain resource assignment—$\lceil \log_2 (N_{RB}^{DL,BwP}(N_{RB}^{DL,BWP}+1)/2) \rceil$ bits
    $N_{RB}^{DL,BWP}$ is the size of the initial bandwidth part in case DCI format 1_0 is monitored in the common search space in CORESET 0
    $N_{RB}^{DL,BWP}$ is the size of the active bandwidth part in case DCI format 1_0 is monitored in the UE specific search space and satisfying
      the total number of different DCI sizes monitored per slot is no more than 4, and
      the total number of different DCI sizes with C-RNTI monitored per slot is no more than 3

Time domain resource assignment—X bits as defined in Subclause 5.1.2.1 of [6, TS38.214]

VRB-to-PRB mapping—1 bit

Modulation and coding scheme—5 bits as defined in Subclause 5.1.3 of [6, TS38.214], using Table 5.1.3.1-1

New data indicator—1 bit, reserved

Redundancy version—2 bits, reserved

HARQ process number—4 bits, reserved

Downlink assignment index—2 bits, reserved

TPC command for scheduled PUCCH—2 bits, reserved

PUCCH resource indicator—3 bits, reserved

PDSCH-to-HARQ_feedback timing indicator—3 bits, reserved

The following information is transmitted by means of the DCI format 1_0 with CRC scrambled by TC-RNTI:

Identifier for DCI formats—1 bit

The value of this bit field is always set to 1, indicating a DL DCI format

Frequency domain resource assignment—$\lceil \log_2(N_{RB}^{DL,BwP}(N_{RB}^{DL,BWP}+1)/2) \rceil$ bits $N_{RB}^{DL,BWP}$ is the size of the initial bandwidth part in case DCI format 1_0 is monitored in the common search space in CORESET 0

$N_{RB}^{DL,BWP}$ is the size of the active bandwidth part in case DCI format 0_0 is monitored in the UE specific search space and satisfying the total number of different DCI sizes monitored per slot is no more than 4, and the total number of different DCI sizes with C-RNTI monitored per slot is no more than 3

Time domain resource assignment—X bits as defined in Subclause 5.1.2.1 of [6, TS38.214]

VRB-to-PRB mapping—1 bit

Modulation and coding scheme—5 bits as defined in Subclause 5.1.3 of [6, TS38.214], using Table 5.1.3.1-1

New data indicator—1 bit

Redundancy version—2 bits as defined in Table 7.3.1.1.1-2

HARQ process number—4 bits

Downlink assignment index—2 bits, reserved

TPC command for scheduled PUCCH—2 bits as defined in Subclause 7.2.1 of [5, TS38.213]

PUCCH resource indicator—3 bits as defined in Subclause 9.2.3 of [5, TS38.213]

PDSCH-to-HARQ_feedback timing indicator—3 bits as defined in Subclause x.x of [5, TS38.213]

The following information is transmitted by means of the DCI format 1_0 with CRC scrambled by CS-RNTI:

XXX—x bit 7.3.1.2.2 Format 1_1

DCI format 1_1 is used for the scheduling of PDSCH in one cell.

The following information is transmitted by means of the DCI format 1_1 with CRC scrambled by C-RNTI:

Carrier indicator—0 or 3 bits as defined in Subclause x.x of [5, TS 38.213].

Identifier for DCI formats—1 bits

The value of this bit field is always set to 1, indicating a DL DCI format

Bandwidth part indicator—0, 1 or 2 bits as defined in Table 7.3.1.1.2-1. The bitwidth for this field is determined as $\lceil \log_2(n_{BWP}) \rceil$ bits, where $n_{BWP}=n_{BWP,RRC}+1$ if the higher layer parameter BandwidthPart-Config configures up to 3 bandwidth parts and the initial bandwidth part is not included in higher layer parameter BandwidthPart-Config;

otherwise $n_{BWP}=n_{BWP,RRC}$;

$n_{BWP,RRC}$ is the number of configured bandwidth parts according to higher layer parameter BandwidthPart-Config.

Frequency domain resource assignment—number of bits determined by the following, where $n_{RB}^{DL,BWP}$ is the size of the active bandwidth part:

$N_{RBG}$ bits if only resource allocation type 0 is configured, where $N_{RBG}$ is defined in Subclause 5.1.2.2.1 of [6, TS38.214], $\lceil \log_2(N_{RB}^{DL,BwP}(N_{RB}^{DL,BWP}+1)/2) \rceil$ bits if only resource allocation type 1 is configured, or max ($\lceil \log_2(N_{RB}^{DL,BWP}(N_{RB}^{DL,BWP}+1)/2) \rceil$, $N_{RBG}$)+1 bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 5.1.2.2.1 of [6, TS 38.214].

For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]

Time domain resource assignment—0, 1, 2, 3, or 4 bits as defined in Subclause 5.1.2.1 of [6, TS 38.214]. The bitwidth for this field is determined as $\lceil \log_2(l) \rceil$ bits, where l is the number of entries in the higher layer parameter pdsch-AllocationList.

VRB-to-PRB mapping—0 or 1 bit:

0 bit if only resource allocation type 0 is configured;

1 bit according to Table 7.3.1.1.2-33 otherwise, only applicable to resource allocation type 1, as defined in Subclause xxx of [4, TS 38.211].

PRB bundling size indicator—0 bit if the higher layer parameter PRB bundling is not configured or is set to 'static', or 1 bit if the higher layer parameter PRB bundling is set to 'dynamic' according to Subclause 5.1.2.3 of [6, TS 38.214].

Rate matching indicator—0, 1, or 2 bits according to higher layer parameter rate-match-PDSCH-resource-set.

ZP CSI-RS trigger—0, 1, or 2 bits as defined in Subclause x.x of [6, TS 38.214]. The bitwidth for this field is determined as $\lceil \log_2(n_{ZP}+1) \rceil$ bits, where $n_{ZP}$ is the number of ZP CSI-RS resource sets in the higher layer parameter [ZP-CSI-RS-ResourceConfigList].

For transport block 1:

Modulation and coding scheme—5 bits as defined in Subclause x.x of [6, TS 38.214]

New data indicator—1 bit

Redundancy version—2 bits as defined in Table 7.3.1.1.1-2

For transport block 2 (only present if Number-MCS-HARQ-DL-DCI equals 2):
  Modulation and coding scheme—5 bits as defined in Subclause x.x of [6, TS 38.214]
  New data indicator—1 bit
  Redundancy version—2 bits as defined in Table 7.3.1.1.1-2
HARQ process number—4 bits
Downlink assignment index—number of bits as defined in the following
  4 bits if more than one serving cell are configured in the DL and the higher layer parameter HARQ-ACK-codebook=dynamic, where the 2 MSB bits are the counter DAI and the 2 LSB bits are the total DAI;
  2 bits if only one serving cell is configured in the DL and the higher layer parameter HARQ-ACK-codebook=dynamic, where the 2 bits are the counter DAI;
  0 bits otherwise.
TPC command for scheduled PUCCH—2 bits as defined in Subclause x.x of [5, TS 38.213]
PUCCH resource indicator—3 bits as defined in Subclause 9.2.3 of [5, TS 38.213]
PDSCH-to-HARQ_feedback timing indicator—3 bits as defined in Subclause 9.2.3 of [5, TS 38.213]
Antenna port(s)—4, 5, or 6 bits as defined by Tables 7.3.1.2.2-1/2/3/4, where the number of CDM groups without data of values 1, 2, and 3 refers to CDM groups {0}, {0,1}, and {0, 1,2} respectively.
Transmission configuration indication—0 bit if higher layer parameter tci-PresentInDCI is not enabled; otherwise 3 bits as defined in Subclause x.x of [6, TS38.214].
SRS request—2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24.
CBG transmission information (CBGTI)—0, 2, 4, 6, or 8 bits as defined in Subclause x.x of [6, TS38.214], determined by higher layer parameter maxCodeBlock-GroupsPerTransportBlock for the PDCCH.
CBG flushing out information (CBGFI)—0 or 1 bit as defined in Subclause x.x of [6, TS38.214], determined by higher layer parameter codeBlockGroupFlushIndicator.
DMRS sequence initialization—1 bit for $n_{SCID}$ selection defined in Subclause 7.4.1.1.1 of [4, TS 38.211].
The following information is transmitted by means of the DCI format 1_1 with CRC scrambled by CS-RNTI:
  XXX—x bit
3GPP TS 38.213 V15.1.0 provides some description related to BWP, CORESET, and DCI contents as follows:
10 UE Procedure for Receiving Control Information
10.1 UE Procedure for Determining Physical Downlink Control Channel Assignment
A set of PDCCH candidates for a UE to monitor is defined in terms of PDCCH search spaces. A search space can be a common search space or a UE-specific search space. A UE shall monitor PDCCH candidates in one or more of the following search spaces
  a Type0-PDCCH common search space for a DCI format with CRC scrambled by a SI-RNTI on a primary cell;
  a Type0A-PDCCH common search space for a DCI format with CRC scrambled by a SI-RNTI on a primary cell;
  a Type1-PDCCH common search space for a DCI format with CRC scrambled by a RA-RNTI, or a TC-RNTI, or a C-RNTI on a primary cell;
  a Type2-PDCCH common search space for a DCI format with CRC scrambled by a P-RNTI on a primary cell;
  a Type3-PDCCH common search space for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s), or SP-CSI-RNTI; and
  a UE-specific search space for a DCI format with CRC scrambled by C-RNTI, or CS-RNTI(s), or SP-CSI-RNTI.
[ . . . ]
The UE may assume that the DM-RS antenna port associated with PDCCH reception in the Type0-PDCCH common search space, the Type0A-PDCCH common search space, and the Type2-PDCCH common search space, and for corresponding PDSCH receptions, and the DM-RS antenna port associated with SS/PBCH reception are quasi co-located with respect to delay spread, Doppler spread, Doppler shift, average delay, and spatial Rx parameters. The value for the DM-RS scrambling sequence initialization is the cell ID.
A UE may assume that the DM-RS antenna port associated with PDCCH reception and associated PDSCH reception in the Type1-PDCCH common search space are quasi co-located with the SS/PBCH block identified in initial access procedure or with a received CSI-RS with respect to delay spread, Doppler spread, Doppler shift, average delay, and spatial Rx parameters, when applicable.
If a UE is configured for downlink bandwidth part (BWP) operation, as described in Subclause 12, the above configurations for the common search spaces apply for the initial active DL BWP. The UE can be additionally configured a control resource set for Type0-PDCCH common search space, Type0A-PDCCH common search space, Type1-PDCCH common search space, or Type2-PDCCH common search space for each configured DL BWP on the primary cell, other than the initial active DL BWP, as described in Subclause 12.
For each DL BWP configured to a UE in a serving cell, a UE can be provided by higher layer signalling with P control resource sets where P≤3. For control resource set p, 0≤p<P, the higher layer signalling provides:
  a control resource set index by higher layer parameter CORESET-ID;
  a DM-RS scrambling sequence initialization value by higher layer parameter PDCCH-DMRS-Scrambling-ID;
  a number of consecutive symbols provided by higher layer parameter CORESET-time-duration;
  a set of resource blocks provided by higher layer parameter CORESET-freq-dom;
  a CCE-to-REG mapping provided by higher layer parameter CORESET-CCE-to-REG-mapping-type;
  a REG bundle size, in case of interleaved CCE-to-REG mapping, provided by higher layer parameter CORESET-REG-bundle-size;
  a cyclic shift for the REG bundle interleaver [4, 38.211] by higher layer parameter CORESET-shift-index;
  an antenna port quasi co-location, from a set of antenna port quasi co-locations provided by higher layer parameter TCI-StatesPDCCH, indicating quasi co-location information of the DM-RS antenna port for PDCCH reception;

an indication for a presence or absence of a transmission configuration indication (TCI) field for DCI format 1_0 or DCI format 1_1 transmitted by a PDCCH in control resource set p, by higher layer parameter TCI-PresentInDCI.

For each control resource set in a DL BWP of a serving cell, a respective higher layer parameter CORESET-freq-dom provides a bitmap. The bits of the bitmap have a one-to-one mapping with non-overlapping groups of 6 PRBs, in ascending order of the PRB index in the DL BWP bandwidth of $N_{RB}^{BWP}$ PRBs with starting position $N_{BWP}^{start}$ where the first PRB of the first group of 6 PRBs has index $6 \cdot \lceil N_{BWP}^{start}/6 \rceil$. A group of 6 PRBs is allocated to a control resource set if a corresponding bit value in the bitmap is 1; else, if a corresponding bit value in the bitmap is 0, the group of 6 PRBs is not allocated to the control resource set.

If a UE has received initial configuration of more than one TCI states by higher layer parameter TCI-StatesPDCCH containing more than one TCI states but has not received a MAC CE activation for one of the TCI states, the UE assumes that the DM-RS antenna port associated with PDCCH reception in the UE-specific search space is quasi co-located with the SS/PBCH block the UE identified during the initial access procedure with respect to delay spread, Doppler spread, Doppler shift, average delay, and spatial Rx parameters, when applicable.

If a UE has received higher layer parameter TCI-StatesPDCCH containing a single TCI state, the UE assumes that the DM-RS antenna port associated with PDCCH reception in a UE-specific search space is quasi co-located with the one or more DL RS configured by the TCI state.

For each DL BWP of a serving cell where a UE is configured to monitor PDCCH in a search space, the UE is configured the following by higher layer parameter search-space-config:

an association between a search space set index s, 0≤s<S, where S≤10, and a control resource set index p;
   for the search space set s in the control resource set p:
      an indication that the search space set is a common search space set or a UE-specific search space set by higher layer parameter Common-search-space-flag;
      if the search space set s is for a common search space, an indication by higher layer parameter RNTI-monitoring to monitor PDCCH for one or more of DCI format 0_0 and DCI format 1_0 with CRC scrambled by a RNTI from RNTIs described in [5, TS 36.212], DCI format 2_0, DCI format 2_1, DCI format 2_2, and DCI format 2_3;
      if the search space set s is a UE-specific search space, an indication by higher layer parameter USS-DCI-format to monitor PDCCH either for DCI format 0_0 and DCI format 1_0, or for DCI format 0_1 and DCI format 1_1;
      a number of PDCCH candidates $M_{p,s}^{(L)}$ per CCE aggregation level L by higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;
      a PDCCH monitoring periodicity of $k_{p,s}$ slots by higher layer parameter monitoringSlotPeriodicityAndOffset;
      a PDCCH monitoring offset of $o_{p,s}$ slots, where $0 \leq o_{p,s} < k_{p,s}$, by higher layer parameter monitoringSlotPeriodicityAndOffset;
      a PDCCH monitoring pattern within a slot, indicating first symbol(s) of the control resource set within a slot for PDCCH monitoring, by higher layer parameter monitoringSymbolsWithinSlot.

If the higher layer parameter monitoringSymbolsWithinSlot indicates to a UE only one PDCCH monitoring occasion within a slot, the UE is not expected to be configured a corresponding search space set s for a PDCCH subcarrier spacing other than 15 kHz if the control resource set p associated with the search space s includes at least one symbol after the third slot symbol.

For a subcarrier spacing of 15 KHz, if the higher layer parameter monitoringSymbolsWithinSlot for a search space set s indicates to the UE only one PDCCH monitoring occasion in a slot for a corresponding control resource set p and the control resource set p includes at least one symbol after the third slot symbol, the UE expects that all control resource sets configured to the UE are located within at most three same consecutive symbols in the slot.

A UE determines a PDCCH monitoring occasion from the PDCCH monitoring periodicity, the PDCCH monitoring offset, and the PDCCH monitoring pattern within a slot. For search space set s in control resource set p, the UE determines that a PDCCH monitoring occasion(s) exists in a slot with number $n_{s,f}^\mu$ [4, TS 38.211] in a frame with number $n_f$ if $(n_f \cdot N_{slot}^{frame,\mu} + n_{s,f}^\mu - o_{p,s}) \mod k_{p,s} = 0$.

A PDCCH UE-specific search space $S_{k_{p,s}}^{(L)}$ at CCE aggregation level $L \in \{1, 2, 4, 8, 16\}$ is defined by a set of PDCCH candidates for CCE aggregation level L.

For a DL BWP of a serving cell on which a UE monitors PDCCH candidates in a UE-specific search space, if the UE is not configured with a carrier indicator field, the UE shall monitor the PDCCH candidates without carrier indicator field. For a serving cell on which a UE monitors PDCCH candidates in a UE-specific search space, if a UE is configured with a carrier indicator field, the UE shall monitor the PDCCH candidates with carrier indicator field.

A UE is not expected to monitor PDCCH candidates on a DL BWP of a secondary cell if the UE is configured to monitor PDCCH candidates with carrier indicator field corresponding to that secondary cell in another serving cell. For the DL BWP of a serving cell on which the UE monitors PDCCH candidates, the UE shall monitor PDCCH candidates at least for the same serving cell.

A UE is not expected to be configured to monitor DCI format 0_1 or DCI format 1_1 in a common search space. A UE configured to monitor PDCCH candidates in a serving cell with a DCI format size with carrier indicator field and CRC scrambled by C-RNTI, where the PDCCH candidates may have one or more possible values of carrier indicator field for the DCI format size, shall assume that an PDCCH candidate with the DCI format size may be transmitted in the serving cell in any PDCCH UE specific search space corresponding to any of the possible values of carrier indicator field for the DCI format size if the UE includes in UE-NR-Capability an indication for a corresponding capability.

A UE configured with a bandwidth part indicator in DCI formats 0_1 or 1_1 shall, in case of an active DL BWP or of an active UL BWP change, determine the DCI information applicable to the new active DL BWP or UL BWP, respectively, as described in Subclause 12.

12 Bandwidth Part Operation

If the UE is configured with a SCG, the UE shall apply the procedures described in this clause for both MCG and SCG
   When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter DL-BWP and a set of at most four BWPs for transmissions by the UE (UL BWP set) in an UL bandwidth by parameter UL-BWP for the serving cell.

An initial active DL BWP is defined by a location and number of contiguous PRBs, a subcarrier spacing, and a cyclic prefix, for the control resource set for Type0-PDCCH common search space. For operation on the primary cell, a UE is provided by higher layer parameter initial-UL-BWP an initial active UL BWP for a random access procedure. If the UE is configured with a secondary carrier on the primary cell, the UE can be configured with an initial BWP for random access procedure on the secondary carrier.

If a UE has dedicated BWP configuration, the UE can be provided by higher layer parameter Active-BWP-DL-Pcell a first active DL BWP for receptions and by higher layer parameter Active-BWP-UL-Pcell a first active UL BWP for transmissions on the primary cell.

For each DL BWP or UL BWP in a set of DL BWPs or UL BWPs, respectively, the UE is configured the following parameters for the serving cell as defined in [4, TS 38.211] or [6, TS 38.214]:
  a subcarrier spacing provided by higher layer parameter DL-BWP-mu or UL-BWP-mu;
  a cyclic prefix provided by higher layer parameter DL-BWP-CP or UL-BWP-CP;
  a PRB offset with respect to the PRB determined by higher layer parameters offset-pointA-low-scs and ref-scs and a number of contiguous PRBs provided by higher layer parameter DL-BWP-BW or UL-BWP-BW;
  an index in the set of DL BWPs or UL BWPs by respective higher layer parameters DL-BWP-index or UL-BWP-index;
  DCI format 1_0 or DCI format 1_1 detection to a PDSCH reception timing values by higher layer parameter DL-data-time-domain, PDSCH reception to a HARQ-ACK transmission timing values by higher layer parameter DL-data-DL-acknowledgement, and DCI format 0_0 or DCI format 0_1 detection to a PUSCH transmission timing values by higher layer parameter UL-data-time-domain;

For unpaired spectrum operation, a DL BWP from the set of configured DL BWPs with index provided by higher layer parameter DL-BWP-index is paired with an UL BWP from the set of configured UL BWPs with index provided by higher layer parameter UL-BWP-index when the DL BWP index and the UL BWP index are equal. For unpaired spectrum operation, a UE is not expected to receive a configuration where the center frequency for a DL BWP is different than the center frequency for an UL BWP when the DL-BWP-index of the DL BWP is equal to the UL-BWP-index of the UL BWP.

For each DL BWP in a set of DL BWPs on the primary cell, a UE can be configured control resource sets for every type of common search space and for UE-specific search space as described in Subclause 10.1. The UE is not expected to be configured without a common search space on the PCell, or on the PSCell, in the active DL BWP.

For each UL BWP in a set of UL BWPs, the UE is configured resource sets for PUCCH transmissions as described in Subclause 9.2.

A UE receives PDCCH and PDSCH in a DL BWP according to a configured subcarrier spacing and CP length for the DL BWP. A UE transmits PUCCH and PUSCH in an UL BWP according to a configured subcarrier spacing and CP length for the UL BWP.

If a bandwidth part indicator field is configured in DCI format 1_1, the bandwidth part indicator field value indicates the active DL BWP, from the configured DL BWP set, for DL receptions. If a bandwidth part indicator field is configured in DCI format 0_1, the bandwidth part indicator field value indicates the active UL BWP, from the configured UL BWP set, for UL transmissions.

If a bandwidth part indicator field is configured in DCI format 0_1 or DCI format 1_1 and indicates an UL BWP or a DL BWP different from the active UL BWP or DL BWP, respectively, the UE shall
  for each information field in the received DCI format 0_1 or DCI format 11
    if the size of the information field is smaller than the one required for the DCI format 0_1 or DCI format 1_1 interpretation for the UL BWP or DL BWP that is indicated by the bandwidth part indicator, respectively, the UE shall prepend zeros to the information field until its size is the one required for the interpretation of the information field for the UL BWP or DL BWP prior to interpreting the DCI format 0_1 or DCI format 1_1 information fields, respectively;
    if the size of the information field is larger than the one required for the DCI format 0_1 or DCI format 1_1 interpretation for the UL BWP or DL BWP that is indicated by the bandwidth part indicator, respectively, the UE shall use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively;
  set the active UL BWP or DL BWP to the UL BWP or DL BWP indicated by the bandwidth part indicator in the DCI format 0_1 or DCI format 1_1, respectively.

A UE is expected to detect a DCI format 0_1 indicating active UL BWP change, or a DCI format 1_1 indicating active DL BWP change, only if a corresponding PDCCH is received within the first 3 symbols of a slot.

For the primary cell, a UE can be provided by higher layer parameter Default-DL-BWP a default DL BWP among the configured DL BWPs. If a UE is not provided a default DL BWP by higher layer parameter Default-DL-BWP, the default DL BWP is the initial active DL BWP.

If a UE is configured for a secondary cell with higher layer parameter Default-DL-BWP indicating a default DL BWP among the configured DL BWPs and the UE is configured with higher layer parameter BWP-InactivityTimer indicating a timer value, the UE procedures on the secondary cell are same as on the primary cell using the timer value for the secondary cell and the default DL BWP for the secondary cell.

If a UE is configured by higher layer parameter BWP-InactivityTimer a timer value for the primary cell [11, TS 38.321] and the timer is running, the UE increments the timer every interval of 1 millisecond for frequency range 1 or every 0.5 milliseconds for frequency range 2 if the UE does not detect a DCI format 1_1 for paired spectrum operation or if the UE does not detect a DCI format 1_1 or DCI format 0_1 for unpaired spectrum operation during the interval.

If a UE is configured by higher layer parameter Active-BWP-DL-SCell a first active DL BWP and by higher layer parameter Active-BWP-UL-SCell a first active UL BWP on a secondary cell or carrier, the UE uses the indicated DL BWP and the indicated UL BWP on the secondary cell as the respective first active DL BWP and first active UL BWP on the secondary cell or carrier.

For paired spectrum operation, a UE is not expected to transmit HARQ-ACK on a PUCCH resource indicated by a DCI format 1_0 or a DCI format 1_1 if the UE changes its active UL BWP on the PCell between a time of a detection of the DCI format 10 or the DCI format 11 and a time of a corresponding HARQ-ACK transmission on the PUCCH.

A UE is not expected to monitor PDCCH when the UE performs RRM measurements [10, TS 38.133] over a bandwidth that is not within the active DL BWP for the UE.

3GPP TS 38.213 V15.1.0 provides some description related to beam indication, QCL, BWP, and DCI contents as follows:

5.1.5 Antenna Ports Quasi Co-Location

The UE can be configured with up to M TCI-States by higher layer signalling to decode PDSCH according to a detected PDCCH with DCI intended for the UE and the given serving cell, where M depends on the UE capability. Each configured TCI state includes one RS set TCI-RS-SetConfig. Each TCI-RS-SetConfig contains parameters for configuring quasi co-location relationship between the reference signals in the RS set and the DM-RS port group of the PDSCH. The RS set contains a reference to either one or two DL RSs and an associated quasi co-location type (QCL-Type) for each one configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type and may take one or a combination of the following types:

QCL-TypeA': {Doppler shift, Doppler spread, average delay, delay spread}
QCL-TypeB': {Doppler shift, Doppler spread}
QCL-TypeC': {average delay, Doppler shift}
QCL-TypeD': {Spatial Rx parameter}

The UE receives an activation command [10, TS 38.321] used to map up to 8 TCI states to the codepoints of the DCI field Transmission Configuration Indication'. After a UE receives [initial] higher layer configuration of TCI states and before reception of the activation command, the UE may assume that the antenna ports of one DM-RS port group of PDSCH of a serving cell are spatially quasi co-located with the SSB determined in the initial access procedure with respect to Doppler shift, Doppler spread, average delay, delay spread, spatial Rx parameters, where applicable.

If a UE is configured with the higher layer parameter TCI-PresentInDCI that is set as 'Enabled' for the CORESET scheduling the PDSCH, the UE assumes that the TCI field is present in the DL DCI of the PDCCH transmitted on the CORESET. If TCI-PresentInDCI is set as 'Disabled' for the CORESET scheduling the PDSCH or the PDSCH is scheduled by a DCI format 1_0, for determining PDSCH antenna port quasi co-location, the UE assumes that the TCI state for the PDSCH is identical to the TCI state applied for the CORESET used for the PDCCH transmission.

If the TCI-PresentinDCI is set as 'Enabled', the UE shall use the TCI-States according to the value of the 'Transmission Configuration Indication' field in the detected PDCCH with DCI for determining PDSCH antenna port quasi co-location. The UE may assume that the antenna ports of one DM-RS port group of PDSCH of a serving cell are quasi co-located with the RS(s) in the RS set with respect to the QCL type parameter(s) given by the indicated TCI state if the time offset between the reception of the DL DCI and the corresponding PDSCH is equal to or greater than a threshold Threshold-Sched-Offset, where the threshold is based on UE capability. For both the cases when TCI-PresentInDCI='Enabled' and TCI-PresentInDCI='Disabled', if the offset between the reception of the DL DCI and the corresponding PDSCH is less than the threshold Threshold-Sched-Offset, the UE may assume that the antenna ports of one DM-RS port group of PDSCH of a serving cell are quasi co-located based on the TCI state used for PDCCH quasi co-location indication of the lowest CORESET-ID in the latest slot in which one or more CORESETs are configured for the UE. If all configured TCI states do not contain QCL-TypeD', the UE shall obtain the other QCL assumptions from the indicated TCI states for its scheduled PDSCH irrespective of the time offset between the reception of the DL DCI and the corresponding PDSCH.

A UE should expect only the following QCL-Type configurations in TCI-RS-Set:

If a CSI-RS resource is in a CSI-RS resource set configured with higher layer parameter TRS-Info, the UE should only expect QCL-TypeC' or {QCL-TypeC' and QCL-TypeD' } configurations with SS/PBCH block or QCL-TypeD' with a CSI-RS resource in a CSI-RS resource set configured with higher layer parameter CSI-RS-ResourceRep.

If a CSI-RS resource is in a CSI-RS resource set configured without higher layer parameter TRS-Info and without CSI-RS-ResourceRep, the UE should only expect QCL-TypeA' or QCL-TypeB' configuration with a CSI-RS resource in a CSI-RS resource set configured with higher layer parameter TRS-Info or QCL-TypeD' with a CSI-RS resource in a CSI-RS resource set configured with higher layer parameter CSI-RS-ResourceRep.

If a CSI-RS resource in a CSI-RS resource set is configured with higher layer parameter CSI-RS-ResourceRep, the UE should only expect QCL-TypeA' configuration with CSI-RS in a CSI-RS resource set configured with higher layer parameter TRS-Info or {QCL-TypeC' and QCL-TypeD' } configurations with SS/PBCH block or {QCL-TypeD} with a CSI-RS resource in a CSI-RS resource set configured with higher layer parameter CSI-RS-ResourceRep.

For the DM-RS of CORESET scheduling the PDSCH, the UE should only expect QCL-TypeA' configuration with a CSI-RS resource in a CSI-RS resource set configured with higher layer parameter TRS-Info or {QCL-TypeA' and QCL-TypeD' } configuration with SS/PBCH block if UE is not configured with CSI-RS in a CSI-RS resource set configured with higher layer parameter TRS-Info or QCL-TypeD' with a CSI-RS resource in a CSI-RS resource set configured with higher layer parameter CSI-RS-ResourceRep.

For the DM-RS of PDSCH, the UE should only expect QCL-TypeA' configuration with a CSI-RS resource in a CSI-RS resource set configured without higher layer parameter TRS-Info and without CSI-RS-ResourceRep or QCL-TypeA' configuration with a CSI-RS resource in a CSI-RS resource set configured with higher layer parameter TRS-Info or {QCL-TypeA' and QCL-TypeD'} configuration with SS/PBCH block if UE is not configured with a CSI-RS resource in a CSI-RS resource set with higher layer parameter TRS-Info or QCL-TypeD' with a CSI-RS resource in a CSI-RS resource set configured with higher layer parameter CSI-RS-ResourceRep or {QCL-TypeA' and QCL-TypeD'} configuration with CSI-RS resource in a CSI-RS resource set configured without higher layer parameter TRS-Info and without CSI-RS-ResourceRep.

One or multiple of following terminologies may be used hereafter:

- BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
- TRP: A transmission and reception point provides network coverage and directly communicates with UEs. TRP could also be referred to as distributed unit (DU) or network node.
- Cell: A cell is composed of one or multiple associated TRPs, i.e. coverage of the cell is composed of coverage of all associated TRP(s). One cell is controlled by one BS. Cell could also be referred to as TRP group (TRPG).
- Serving beam: A serving beam for a UE is a beam generated by a network node, e.g. TRP, which is currently used to communicate with the UE, e.g. for transmission and/or reception.
- Candidate beam: A candidate beam for a UE is a candidate of a serving beam. Serving beam may or may not be candidate beam.

When UE receives a PDSCH (Physical Downlink Shared Channel), UE may determine PDSCH antenna port quasi co-colocation according to the TCI (Transmission Configuration Indication) field in the scheduling PDCCH (Physical Downlink Control Channel). However, when TCI-PresentInDCI is set as "Disabled" for the CORESET (Control Resource Set) scheduling the PDSCH or the PDSCH is scheduled by a DCI (Downlink Control Information) format 1_0, for determining PDSCH antenna port quasi co-location, the UE assumes that the TCI state for the PDSCH is identical to the TCI state applied for the CORESET used for the PDCCH transmission. In other words, UE uses the TCI state/spatial parameter/beam for receiving the CORESET, where the scheduling PDCCH is received/monitored, to receive the corresponding PDSCH. However, when a bandwidth part (BWP) indicator field is configured in a scheduling DCI and indicates an UL (Uplink) BWP or DL (Downlink) BWP different from (current) active BWP, the UE may switch active BWP from current active BWP to the BWP indicated by the DCI and the story may be different.

If a BWP indicator field in a scheduling DCI indicates a DL BWP different from (current) active DL BWP, each field in the scheduling DCI may need to be interpreted in different way compared to case that no BWP switching is indicated. More specifically, each field in the scheduling DCI may need to be interpreted in different way based on configuration of indicated DL BWP in the scheduling DCI. After interpretation or processing of a field in the scheduling DCI, the UE uses field value indicated by interpreted or processed field to perform corresponding behavior.

Hence, for TCI field, UE may need to process or interpret a TCI field based on configuration of the indicated DL BWP, e.g. padding zero bits or truncate the TCI field bits. Specifically, although UE may determine size or length of a DCI based on configuration of scheduling CORESET when or before decoding, UE may need to further process or interpret a TCI when BWP indicator field in the DCI indicates a DL BWP different from (current) active DL BWP. For example, when TCI-PresentInDCI is set as "Disabled" for the scheduling CORESET in old BWP and TCI-PresentInDCI is set as "Enabled" for all CORESET(s) in new BWP, UE may assume that TCI field is present and pad zero bits to the TCI field. More specifically, UE may assume TCI field value "000" for receiving corresponding PDSCH in new BWP. For the same example, UE may be possible to assume the TCI field is absent just according to TCI-PresentInDCI configured in scheduling CORESET. How to process a TCI field in a DCI indicating active DL BWP change (by a BWP indicator field indicating a DL BWP different from active DL BWP) is still generally unclear until now.

Another unclear issue is that even if a TCI field or state in a DCI indicating active DL BWP change is determined, UE may be uncertain that which BWP for UE to refer to or interpret for the TCI field value. For example, when TCI field is absent or truncated to zero-length, UE may use a TCI state applied for a CORESET to receive the corresponding PDSCH. However, UE may be not sure that which BWP the CORESET belongs to (i.e. old BWP or new BWP). For another example, when TCI field is present or padded zero bits to "000", UE may use an indicated TCI field value in scheduling DCI or "000" to receive the corresponding PDSCH. However, UE may be not sure that which BWP for UE to interpret the indicated TCI state value or "000". In other words, UE may be not sure that which BWP for UE to refer to when mapping codepoint of a TCI field to a TCI state in activated TCI states in a BWP. This issue should be considered.

In this invention, the following solutions or embodiments are (but are not limited to) provided to address the issues mentioned above.

General Concept 1—

One general concept of this invention is that a UE receives or monitors a DCI in a scheduling CORESET, wherein a bandwidth part indicator field (if configured) in the DCI indicates a DL BWP which is different from (current) active DL BWP. In one embodiment, the DCI could indicate DL active BWP change. The UE switches from (current) active DL BWP to the DL BWP indicated by the DCI (i.e. switching from old BWP to new BWP). In one embodiment, the scheduling CORESET could be located in the old BWP.

The UE could determine or assume that whether a TCI field is present in a DCI or not based on configuration of the scheduling CORESET (e.g. TCI-PresentInDCI). In one embodiment, before the UE decodes the DCI (successfully), the UE could determine or assume that whether a TCI field is present in the DCI in a scheduling CORESET or not based on configuration of the scheduling CORESET (e.g. TCI-PresentInDCI). In one embodiment, before the UE could decode the DCI (successfully), for determining size of the DCI for decoding, the UE could determine or assume that whether a TCI field is present in the DCI in a scheduling CORESET or not based on configuration of the scheduling CORESET (e.g. TCI-PresentInDCI).

If or after the UE receives or decodes (successfully) the DCI, the UE may determine that whether a TCI field is present in the DCI or not based on configuration of scheduling CORESET. When or after the UE receives or decodes (successfully) the DCI, the UE may not assume whether a TCI field is present in the DCI or not based on configuration of one or more CORESETs in new BWP (e.g. TCI-PresentInDCI). When or after the UE receives or decodes (successfully) the DCI, the UE may not (further) process a TCI field in the DCI, e.g. padding bits, truncating bits, based on configuration of one or more CORESETs in new BWP.

General Concept 2—

Another concept of this invention is that a UE receives or monitors a DCI in a scheduling CORESET, wherein a bandwidth part indicator field (if configured) in the DCI indicates a DL BWP which is different from (current) active DL BWP. In one embodiment, the DCI could indicate DL active BWP change. The UE switches from (current) active DL BWP to the DL BWP indicated by the DCI (i.e. switching from old BWP to new BWP). In one embodiment, the scheduling CORESET could be located in old BWP.

The UE could determine or assume that whether a TCI field is present in a DCI or not based on configuration of the scheduling CORESET (e.g. TCI-PresentInDCI). In one embodiment, before the UE decodes the DCI (successfully), the UE could determine or assume that whether the TCI field is present in a DCI in a scheduling CORESET or not based on configuration of the scheduling CORESET (e.g. TCI-PresentInDCI). In one embodiment, before the UE decodes the DCI (successfully), for determining size of the DCI for decoding, the UE could determine or assume that whether a TCI field is present in the DCI in a scheduling CORESET or not based on configuration of the scheduling CORESET (e.g. TCI-PresentInDCI).

When or after the UE receives or decodes (successfully) the DCI, the UE may determine that if a TCI field is present in the DCI or not based on configuration of one or more CORESETs in new BWP (e.g. TCI-PresentInDCI). When or after the UE receives or decodes (successfully) the DCI, the UE may assume value of the TCI field based on configuration of one or more CORESETs in new BWP (e.g. TCI-PresentInDCI). When or after the UE receives or decodes (successfully) the DCI, the UE may not (further) process a TCI field in the DCI (e.g. padding bits, truncating bits) based on configuration of the scheduling CORESET (e.g. TCI-PresentInDCI).

General Concept 3—

Another concept of this invention is that a UE receives or monitors a DCI in a scheduling CORESET, wherein a bandwidth part indicator field (if configured) in the DCI indicates a DL BWP which is different from (current) active DL BWP. In one embodiment, the DCI indicates DL active BWP change. The UE switches from (current) active DL BWP to the DL BWP based on the DCI, i.e. switching from old BWP to new BWP. In one embodiment, the scheduling CORESET could be located in old BWP.

The UE could determine or assume that whether a TCI field is present in a DCI or not based on configuration of the scheduling CORESET, e.g. TCI-PresentInDCI. In one embodiment, before the UE decodes the DCI (successfully), the UE could determine or assume that whether a TCI field is present in the DCI in a scheduling CORESET or not based on configuration of the scheduling CORESET (e.g. TCI-PresentInDCI). In one embodiment, before the UE decodes the DCI (successfully), for determining size of the DCI for decoding, the UE could determine or assume that whether a TCI field is present in the DCI in a scheduling CORESET or not based on configuration of the scheduling CORESET (e.g. TCI-PresentInDCI).

In one embodiment, when or after the UE receives or decodes (successfully) the DCI and the DCI indicates active BWP change, the UE may assume a TCI field is present and/or may assume a value of the TCI field to be used to receive corresponding PDSCH, e.g. assume value of the TCI field is "000", regardless of TCI-PresentInDCI for the scheduling CORESET and/or TCI-PresentInDCI for one or more CORESET(s) in new BWP. In one embodiment, when or after the UE receives or decodes (successfully) the DCI and the DCI indicates active BWP change, the UE may assume the TCI field is absent in the DCI and/or may truncate a TCI field in the DCI to zero-length, regardless of TCI-PresentInDCI for the scheduling CORESET and/or TCI-PresentInDCI for one or more CORESET(s) in new BWP.

General Concept 4—

Another concept of this invention is that a UE receives or monitors a DCI in a scheduling CORESET, wherein a bandwidth part indicator field (if configured) in the DCI indicates a DL BWP which is different from (current) active DL BWP. In one embodiment, the DCI could indicate DL active BWP change. The UE switches from (current) active DL BWP to the DL BWP based on the DCI (i.e. switching from old BWP to new BWP). In one embodiment, the scheduling CORESET could be located in old BWP.

The UE may receive corresponding PDSCH based on a TCI state. In one embodiment, the TCI state could be explicitly or implicitly indicated by the DCI (e.g. a TCI field in the DCI). In one embodiment, the TCI state could be a TCI configured or activated for receiving PDSCH/PDCCH transmitted in old BWP. Alternatively, the TCI state could be identical to a TCI state applied for receiving the scheduling CORESET.

In one embodiment, the UE may assume that the antenna ports of one DM-RS port group of corresponding PDSCH of are quasi co-located with a reference signal in the RS set with respect to the QCL type parameter(s) given by the TCI state. In one embodiment, the reference signal could be transmitted in old BWP.

In one embodiment, the UE may receive corresponding PDSCH via antenna port quasi co-location information derived from the reference signal in the RS set with respect to the QCL type parameter(s) given by the TCI state. In one embodiment, the reference signal could be transmitted in old BWP.

General Concept 5—

Another concept of this invention is that a UE receives/monitors a DCI in a scheduling CORESET, wherein a bandwidth part indicator field (if configured) in the DCI indicates a DL BWP which is different from (current) active DL BWP. In one embodiment, the DCI could indicate DL active BWP change. The UE switches from (current) active DL BWP to the DL BWP based on the DCI (i.e. switching from old BWP to new BWP). In one embodiment, the scheduling CORESET could be located in old BWP.

The UE may receive corresponding PDSCH based on a TCI state. In one embodiment, the TCI state could be indicated by a TCI field. In one embodiment, the TCI field is indicated in the DCI, without further interpretation or processing, e.g. truncating bits or padding bits based on configuration of new BWP. In one embodiment, the TCI field is derived by at least configuration of one or more CORESET(s) in new BWP (e.g. padding bits to the TCI field, truncate bits of the TCI field). In one embodiment, the TCI state could be a TCI state configured or activated for receiving PDSCH or PDCCH transmitted in new BWP. Additionally or alternatively, the TCI state could be identical to a TCI state applied for receiving one of CORESET(s) in new BWP.

General Concept 6—

Another concept of this invention is that a UE receives or monitors a DCI in a scheduling CORESET, wherein a bandwidth part indicator field (if configured) in the DCI indicates a DL BWP which is different from (current) active DL BWP. In one embodiment, the DCI could indicate DL active BWP change. The UE switches from (current) active DL BWP to the DL BWP based on the DCI (i.e. switching from old BWP to new BWP). In one embodiment, the scheduling CORESET could be located in old BWP.

The UE is configured or indicated a time window. In one embodiment, the time window could start at a time unit when the UE receives the DCI. Alternatively, the time window could start at a time unit when the UE switches to new BWP. The time window could be for UE to measure RS(s) associated with TCI state(s) activated for receiving PDSCH in new BWP.

In one embodiment, the starting symbol of corresponding PDSCH could be at the end of the time window or after the end of the time window. In one embodiment, the starting symbol of corresponding PDSCH could always be located at the end of the time window and/or always located after the end of the time window. In one embodiment, the starting symbol of corresponding PDSCH could be not allowed to be located before the end of the time window.

If the starting symbol of corresponding PDSCH is within the time window, the UE may assume that the antenna ports of one DM-RS port group of corresponding PDSCH of are quasi co-located with a reference signal, wherein the reference signal is associated with a TCI state configured/activated for receiving PDSCH and/or PDCCH in old BWP. In one embodiment, when the starting symbol of corresponding PDSCH is within the time window, the UE may receive corresponding PDSCH via antenna port quasi co-location information derived from a reference signal, wherein the reference signal is associated with a TCI state configured/activated for receiving PDSCH and/or PDCCH in old BWP.

If the starting symbol of corresponding PDSCH is at the end of the time window and/or after the end of the time window, the UE may assume that the antenna ports of one DM-RS port group of corresponding PDSCH of are quasi co-located with a reference signal, wherein the reference signal is associated with a TCI state configured or activated for receiving PDSCH and/or PDCCH in new BWP. In one embodiment, when the starting symbol of corresponding PDSCH is at the end of the time window and/or after the end of the time window, the UE may receive corresponding PDSCH via antenna port quasi co-location information derived from a reference signal, wherein the reference signal is associated with a TCI state configured or activated for receiving PDSCH and/or PDCCH in new BWP.

Embodiment 1

A UE receives and/or monitors a DCI in a scheduling CORESET in a first BWP. A bandwidth part (BWP) indicator field in the DCI could indicate a second BWP different from the first BWP. In one embodiment, the DCI could indicate DL active BWP change.

The UE determines or assumes that whether a TCI field is present in the DCI or not based on configuration of the scheduling CORESET (e.g. TCI-PresentInDCI). In one embodiment, before the UE decodes the DCI (successfully), the UE could determine or assume that whether a TCI field is present in a DCI in a scheduling CORESET or not based on configuration of the scheduling CORESET (e.g. TCI-PresentInDCI). In one embodiment, before the UE decodes the DCI (successfully), for determining size of the DCI for decoding, the UE could determine or assume that whether a TCI field is present in the DCI in a scheduling CORESET or not based on configuration of the scheduling CORESET (e.g. TCI-PresentInDCI).

If or after the UE receives or decodes (successfully) the DCI, the UE could change active DL BWP from the first BWP to the second BWP. In one embodiment, the index of the second BWP could be indicated by the BWP indicator field in the DCI.

If or after the UE receives or decodes (successfully) the DCI, the UE may determine that whether the TCI field is present in the DCI or not based on configuration of scheduling CORESET. In one embodiment, when or after the UE receives or decodes (successfully) the DCI, the UE may not assume whether or not the TCI field is present in the DCI based on configuration of one or more CORESETs in new BWP (e.g. TCI-PresentInDCI).

In one embodiment, when or after the UE receives or decodes (successfully) the DCI, the UE may not (further) process or interpret the TCI field in the DCI (e.g. padding bits, truncating bits). In one embodiment, when or after the UE receives or decodes (successfully) the DCI, the UE may not (further) process the TCI field in the DCI (e.g. padding bits, truncating bits) based on configuration of one or more CORESETs in the second BWP. In one embodiment, when or after the UE processes or interprets the DCI, the UE could determine or assume that whether a TCI field is present in the DCI or not based on configuration of the scheduling CORESET (e.g. TCI-PresentInDCI).

In one embodiment, before the UE decodes the DCI (successfully), the UE could determine field size of at least one field in the DCI based on configuration of the first BWP. In one embodiment, before the UE decodes the DCI (successfully), for determining size of the DCI for decoding, the UE could determine field size of the at least one field in the DCI based on configuration of the first BWP.

In one embodiment, when or after the UE receives or decodes (successfully) the DCI, the UE may process or interpret the at least one field in the DCI (e.g. padding bits, truncating bits). In one embodiment, when or after the UE receives or decodes (successfully) the DCI, the UE may (further) process the at least one field in the DCI (e.g. padding bits, truncating bits) based on configuration of the second BWP. If or after the UE processes or interprets the at least one field, the UE may perform behavior or indication based on field value from the at least one field with being processed or interpreted (e.g. padding bits, truncating bits). For example, the at least one field could be frequency resource assignment field. In one embodiment, the at least one field could not be TCI field. In one embodiment, the UE may receive a corresponding PDSCH based on field value from the processed or interpreted frequency resource assignment field. In one embodiment, field size of the at least one field with being processed or interpreted may be different from that of the at least one field determined before the UE decodes the DCI (successfully).

The UE may receive a corresponding PDSCH indicated in the DCI based on a TCI state. In one embodiment, the TCI state could be explicitly or implicitly indicated by the TCI field. In one embodiment, the TCI state could be indicated by or derived from the TCI field with being further processed or interpreted by the UE, e.g. padding bits or truncating bits. The TCI state could be a TCI state configured or activated for receiving PDSCH or PDCCH transmitted in the first BWP or in the second BWP. Additionally or alternatively, the TCI state could be identical to a TCI state applied for receiving the scheduling CORESET.

Additionally or alternatively, when the TCI state is not explicitly or implicitly indicated by the TCI field, the UE may assume the TCI state is identical to a TCI state applied for the scheduling CORESET. Alternatively, when the TCI state is not explicitly or implicitly indicated by the TCI field, the UE may assume the TCI state is identical to a TCI state applied for one of CORESET(s) in the second BWP, e.g. a CORESET with the lowest CORESET-ID in the latest slot in which one or more CORESETs within the second BWP are configured.

In one embodiment, the UE may assume that the antenna ports of one DM-RS port group of the corresponding PDSCH of are quasi co-located with a reference signal in the RS set with respect to the QCL type parameter(s) given by the TCI state. Furthermore, the UE may receive the corresponding PDSCH via antenna port quasi co-location information derived from the reference signal in the RS set with respect to the QCL type parameter(s) given by the TCI state. The TCI state could be configured or activated for receiving PDSCH and/or PDCCH transmitted in the first BWP or in the second BWP.

In one embodiment, the UE may be configured with a BWP indicator field. When the UE is configured with a BWP indicator field, the DCI may comprise the BWP indicator field. Furthermore, if the UE receives a BWP indicator field indicating a BWP different from (current) active BWP, the UE may switch from active BWP to the BWP indicated by the BWP indicator field. In addition, if the UE receives a BWP indicator field indicates a BWP the same as (current) active BWP, the UE may transmit/receive signals on (current) active BWP.

In one embodiment, the first BWP can be DL BWP or UL BWP. The second BWP could also be DL BWP or UL BWP. In one embodiment, the DCI may be DCI format 1_0 or DCI format 0_0. The UE could interpret or process a field in the DCI based on configuration of the first BWP. The field could be a TCI field.

In one embodiment, parameter or configuration of current active BWP may refer to or comprise configuration of the scheduling CORESET (i.e. TCI-PresentInDCI). When the UE receives the DCI, the UE may interpret or process each field in the DCI other than the TCI field by truncating bits or padding bits based on configuration of the second BWP. The configuration of the first BWP could be different from configuration of the second BWP. In one embodiment, the configuration of a BWP could indicate bandwidth of the BWP, PUCCH resource on the BWP, PDSCH-to-HARQ-ACK timing, a time domain resource allocation table, and/or rate matching related parameter for the BWP.

Embodiment 2

A UE receives and/or monitors a DCI in a scheduling CORESET in a first BWP. A bandwidth part (BWP) indicator field in the DCI could indicate a second BWP different from the first BWP. In one embodiment, the DCI could indicate DL active BWP change.

The UE determines or assumes that whether a TCI field is present in the DCI or not based on configuration of the scheduling CORESET (e.g. TCI-PresentInDCI). Furthermore, the UE determines or assumes that whether a TCI field is present in the DCI or not after the UE processes or interprets the DCI based on configuration of one or more CORESETs in the second BWP.

In one embodiment, before the UE decodes the DCI (successfully), the UE could determine or assume that whether a TCI field is present in the DCI in a scheduling CORESET or not based on configuration of the scheduling CORESET (e.g. TCI-PresentInDCI). In one embodiment, before the UE decodes the DCI (successfully), for determining size of the DCI for decoding, the UE could determine or assume that whether a TCI field is present in the DCI in a scheduling CORESET or not based on configuration of the scheduling CORESET (e.g. TCI-PresentInDCI).

If or after the UE receives or decodes (successfully) the DCI, the UE could change active DL BWP from the first BWP to the second BWP. The index of the second BWP could be indicated by the BWP indicator field in the DCI.

If or after the UE receives or decodes (successfully) the DCI, the UE may determine that whether the TCI field is present in the DCI or not based on configuration of one or more CORESETs in the second BWP (e.g. TCI-PresentInDCI). In one embodiment, when or after the UE receives or decodes (successfully) the DCI, the UE may assume value of the TCI field based on configuration of one or more CORESETs in the second BWP (e.g. TCI-PresentInDCI). In one embodiment, when or after the UE receives or decodes (successfully) the DCI, the UE may not (further) process a TCI field in the DCI, e.g. padding bits, truncating bits, based on configuration of the scheduling CORESET (e.g. TCI-PresentInDCI).

In one embodiment, when or after the UE processes or interprets the DCI, the UE could determine or assume that whether a TCI field is present in the DCI or not based on configuration of one or more CORESETs in the second BWP (e.g. TCI-PresentInDCI). Additionally, based on configuration of one or more CORESETs in the second BWP, the UE may assume the TCI field is present in the DCI and/or assume value of the TCI field (such as assume value of the TCI field is "000" when the bit length of the TCI field is 3-bit) even when TCI-PresentInDCI is "Disabled" for the scheduling CORESET. Furthermore, the UE may assume the TCI field is present with zero-length and/or pad zero bits to the TCI field to full length for the TCI field based on configuration of the second BWP.

In one embodiment, based on configuration of one or more CORESETs in the second BWP, the UE may assume the TCI field is absent in the DCI and/or truncate the TCI field in the DCI to zero-length, even when TCI-PresentInDCI is "Enabled" for the scheduling CORESET.

The UE may receive a corresponding PDSCH indicated in the DCI based on a TCI state. In one embodiment, the TCI state could be explicitly or implicitly indicated by the TCI field. In one embodiment, the TCI state could be indicated by or derived from the TCI field with being further processed or interpreted by the UE, e.g. padding bits or truncating bits. The TCI state could be a TCI state configured or activated for receiving PDSCH or PDCCH transmitted in the first BWP or in the second BWP. Additionally or alternatively, the TCI state could be identical to a TCI state applied for receiving the scheduling CORESET. Additionally, when the TCI state is not explicitly or implicitly indicated by the TCI field, the UE may assume the TCI state is identical to a TCI state applied for the scheduling CORESET. In particular, when the TCI state is not explicitly or implicitly indicated by the TCI field, the UE may assume the TCI state is identical to a TCI state applied for one of CORESET(s) in the second BWP, e.g. a CORESET with the lowest CORE- SET-ID in the latest slot in which one or more CORESETs within the second BWP are configured.

In one embodiment, the UE may assume that the antenna ports of one DM-RS port group of corresponding PDSCH are quasi co-located with a reference signal in the RS set with respect to the QCL type parameter(s) given by the TCI state. The UE may receive the corresponding PDSCH via antenna port quasi co-location information derived from the reference signal in the RS set with respect to the QCL type parameter(s) given by the TCI state.

In one embodiment, the TCI state could be configured or activated for receiving PDSCH and/or PDCCH transmitted in the first BWP or in the second BWP. In one embodiment, the UE may be configured with a BWP indicator field. When the UE is configured with a BWP indicator field, the DCI may comprise the BWP indicator field.

In one embodiment, when the UE receives a BWP indicator field indicating a BWP different from (current) active BWP, the UE may switch from active BWP to the BWP indicated by the BWP indicator field. Furthermore, when the UE receives a BWP indicator field indicates a BWP the same as (current) active BWP, the UE may transmit or receive signals on (current) active BWP.

In one embodiment, the first BWP can be DL BWP or UL BWP. The second BWP can also be DL BWP or UL BWP. The DCI may refer to DCI format 1_0 or DCI format 0_0. The UE could interpret or process a field in the DCI based on configuration of the first BWP or the second BWP. The field could be a TCI field.

Embodiment 3

A UE receives or monitors a DCI in a scheduling CORESET in a first BWP. A bandwidth part (BWP) indicator field in the DCI indicates a second BWP different from the first BWP. In one embodiment, the DCI indicates DL active BWP change.

The UE determines and/or assumes that whether a TCI field is present in the DCI or not based on configuration of the scheduling CORESET (e.g. TCI-PresentInDCI). In one embodiment, before the UE decodes the DCI (successfully), the UE could determine or assume that whether a TCI field is present in the DCI in a scheduling CORESET or not based on configuration of the scheduling CORESET (e.g. TCI-PresentInDCI). In particular, before the UE decodes the DCI (successfully), for determining size of the DCI for decoding, the UE could determine or assume that whether a TCI field is present in the DCI in a scheduling CORESET or not based on configuration of the scheduling CORESET (e.g. TCI-PresentInDCI).

If or after the UE receives or decodes (successfully) the DCI, the UE could change active DL BWP from the first BWP to the second BWP. In one embodiment, the index of the second BWP could be indicated by the BWP indicator field in the DCI. When or after the UE receives or decodes (successfully) the DCI, the UE may assume the TCI field is present or absent regardless of TCI-PresentInDCI in configuration of scheduling CORESET, which can be implemented with the following alternatives.

Alternative 1—

When or after the UE receives or decodes (successfully) the DCI and when TCI-PresentInDCI is "Disabled" for the scheduling CORESET, the UE may assume the TCI field is present in the DCI and assume value of the TCI field, e.g. assume value of the TCI field is "000" when bit length of the TCI field is 3-bit. In one embodiment, the UE may assume the TCI field is present with zero-length and pad zero bits to the TCI field to full length, e.g. pad zero bits to value "000" assuming bit length of the TCI field is 3-bit. In particular, the UE may assume a TCI field is present and/or assume value of the TCI field (e.g. assume value of the TCI field is "000" when bit length of the TCI field is 3-bit), regardless of TCI-PresentInDCI for the scheduling CORESET and/or TCI-PresentInDCI for one or more CORESET(s) in new BWP.

In one embodiment, when the TCI field is not present in the DCI, the UE could assume or use a value of TCI field applied for receiving corresponding PDSCH (e.g. assume value of the TCI field is "000" or use "000") when bit length of the TCI field is 3-bit. When TCI-PresentInDCI is "Disabled" for the scheduling CORESET and TCI-PresentInDCI for all CORESET(s) in the second BWP is "Disabled", the UE may assume a value of the TCI field, e.g. assume value of the TCI field is "000", when bit length of the TCI field is 3-bit.

In one embodiment, when TCI-PresentInDCI is "Enabled" for the scheduling CORESET and TCI-PresentInDCI for all CORESET(s) in the second BWP is "Disabled", the UE may assume a value of TCI field, e.g. assume value of the TCI field is "000" when bit length of the TCI field is 3-bit, and the UE may discard, ignore, or not use the (exact) value indicated in the TCI field in the DCI.

Alternative 2—

When or after the UE receives or decodes (successfully) the DCI and when TCI-PresentInDCI is "Enabled" for the scheduling CORESET, the UE may assume a TCI field is absent in the DCI and/or assume a TCI field in the DCI is truncated to zero-length. In particular, when or after the UE receives or decodes (successfully) the DCI, the UE may assume the TCI field is absent in the DCI and/or truncate a TCI field in the DCI to zero-length, regardless of TCI-PresentInDCI for the scheduling CORESET and/or TCI-PresentInDCI for one or more CORESET(s) in new BWP.

In one embodiment, when the TCI field is present in the DCI, the UE could discard, ignore, or does not use the TCI field. The UE may not expect that the TCI field in the DCI indicates a value other than a specific value (e.g. the specific value can be "000" assuming bit length of the TCI field is 3-bit).

In one embodiment, the UE may receive corresponding PDSCH based on a TCI state. The TCI state could be explicitly or implicitly indicated by the TCI field. The TCI state could be a TCI state configured or activated for receiving PDSCH or PDCCH transmitted in the first BWP or in the second BWP. Alternatively, the TCI state could be identical to a TCI state applied for receiving the scheduling CORESET. Additionally, when the TCI state is not explicitly or implicitly indicated by the TCI field, the UE may assume the TCI state is identical to a TCI state applied for the scheduling CORESET. Alternatively, when the TCI state is not explicitly or implicitly indicated by the TCI field, the UE may assume the TCI state is identical to a TCI state applied for one of CORESET(s) in the second BWP, e.g. a CORESET with the lowest CORESET-ID in the latest slot in which one or more CORESETs within the second BWP are configured.

In one embodiment, the UE may assume that the antenna ports of one DM-RS port group of corresponding PDSCH of are quasi co-located with a reference signal in the RS set with respect to the QCL type parameter(s) given by the TCI state. The UE may receive corresponding PDSCH via antenna port quasi co-location information derived from the reference signal in the RS set with respect to the QCL type parameter(s) given by the TCI state.

In one embodiment, the UE may be configured with a BWP indicator field. When the UE is configured with a BWP indicator field, the DCI may comprise the BWP indicator field. When the UE receives a BWP indicator field indicating a BWP different from (current) active BWP, the UE may switch from active BWP to the BWP indicated by the BWP indicator field. When the UE receives a BWP indicator field indicates a BWP the same as (current) active BWP, the UE may transmit/receive signals on (current) active BWP.

In one embodiment, the first BWP can be DL BWP or UL BWP. The second BWP can also be DL BWP or UL BWP. The DCI may refer to DCI format 1_0 or DCI format 0_0.

Embodiment 4

A UE receives and/or monitors a DCI in a scheduling CORESET in a first BWP. A bandwidth part (BWP) indicator field in the DCI indicates a second BWP different from the first BWP. In one embodiment, the DCI could indicate DL active BWP change.

The UE determines or assumes that whether a TCI field is present in the DCI or not based on configuration of the scheduling CORESET (e.g. TCI-PresentInDCI). In one embodiment, before the UE decodes the DCI (successfully), the UE could determine or assume that whether a TCI field is present in the DCI in a scheduling CORESET or not based on configuration of the scheduling CORESET (e.g. TCI-PresentInDCI). In particular, before the UE decodes the DCI (successfully), for determining size of the DCI for decoding, the UE could determine or assume that whether a TCI field is present in the DCI in a scheduling CORESET or not based on configuration of the scheduling CORESET (e.g. TCI-PresentInDCI).

If or after the UE receives or decodes (successfully) the DCI, the UE could change active DL BWP from the first BWP to the second BWP. The index of the second BWP could be indicated in the DCI.

The UE could be configured with or indicated a time window. In one embodiment, the time window could start at a time unit when the UE receives the DCI. Alternatively, the time window could start at a time unit when the UE switches to the second BWP. Alternatively, the time window could start at a time unit after a BWP switching delay. In one embodiment, the BWP switching delay could depend on UE's capability. Furthermore, the BWP switching delay could ensure that UE has enough time preparing for BWP switching.

In one embodiment, the time window could be for UE to measure RS(s) associated with TCI state(s) activated for receiving PDSCH in the second BWP. The starting symbol of corresponding PDSCH could be at the end of the time window or after the end of the time window. In one embodiment, the starting symbol of corresponding PDSCH is always at the end of the time window and/or always after the end of the time window. The UE may assume the starting symbol of corresponding PDSCH is at the end of the time window or after the end of the time window. In one embodiment, the UE may not expect that the starting symbol of corresponding PDSCH is within the time window.

In one embodiment, when the starting symbol of corresponding PDSCH is within the time window, the UE may not receive the corresponding PDSCH, the UE may discard or ignore the corresponding PDSCH, and/or the UE may transmit a negative acknowledgement to network, (e.g. NACK).

In one embodiment, the UE may be configured with a BWP indicator field. When the UE is configured with a BWP indicator field, the DCI may comprise the BWP indicator field. Furthermore, when the UE receives a BWP indicator field indicating a BWP different from (current) active BWP, the UE may switch from active BWP to the BWP indicated by the BWP indicator field. In addition, when the UE receives a BWP indicator field indicating a BWP the same as (current) active BWP, the UE may transmit or receive signals on (current) active BWP.

In one embodiment, the first BWP can be DL BWP or UL BWP. The second BWP can also be DL BWP or UL BWP. The DCI may refer to DCI format 1_0 or DCI format 0_0.

Figure 5:
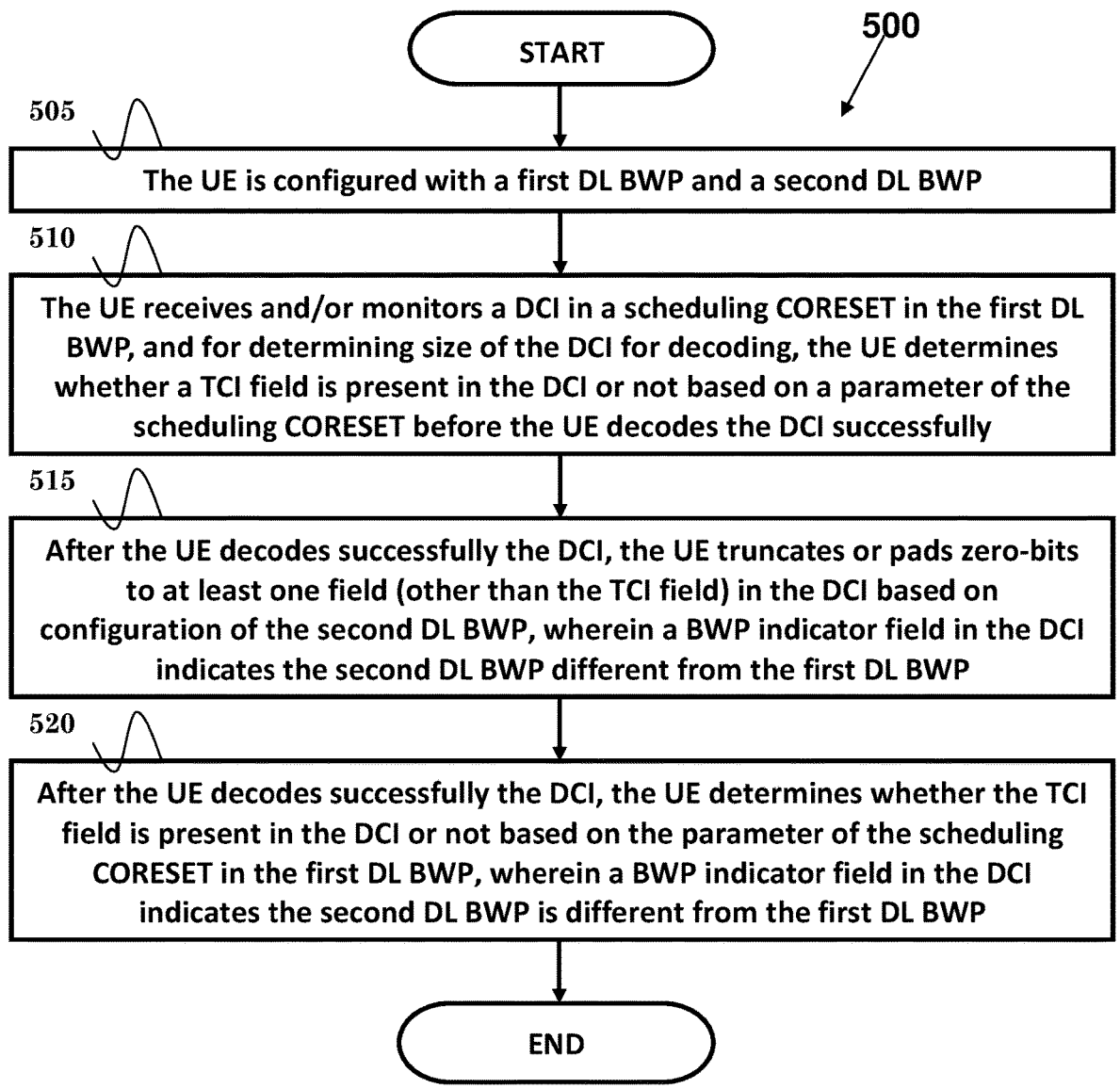
FIG. 5 is a flow chart according to one exemplary embodiment.

FIG. 5 is a flow chart 500 according to one exemplary embodiment from the perspective of a UE. In step 505, the UE is configured with a first DL BWP and a second DL BWP. In step 510, the UE receives and/or monitors a DCI in a scheduling CORESET in the first DL BWP, and for determining size of the DCI for decoding, the UE determines whether a TCI field is present in the DCI or not based on a parameter of the scheduling CORESET before the UE decodes the DCI successfully. In step 515, after the UE decodes successfully the DCI, the UE truncates or pads zero-bits to at least one field other than the TCI field in the DCI based on configuration of the second DL BWP, wherein a BWP part indicator field in the DCI indicates the second DL BWP different from the first DL BWP. In step 520, after the UE decodes successfully the DCI, the UE determines whether the TCI field is present in the DCI or not based on the parameter of the scheduling CORESET in the first DL BWP, wherein a BWP indicator field in the DCI indicates the second DL BWP different from the first DL BWP.

In one embodiment, the parameter could be TCI-PresentInDCI. Furthermore, the UE could receive a corresponding PDSCH scheduled by the DCI based on a TCI state indicated by the TCI field in the DCI when the TCI field is determined to be present in the DCI, wherein the TCI state is configured and/or activated for receiving PDSCH transmitted in the second DL BWP. Additionally or more specifically, the UE could receive the corresponding PDSCH via antenna port quasi co-location information derived from the reference signal in the RS set with respect to the QCL type parameter(s) given by the TCI state.

In one embodiment, after the UE decodes successfully the DCI, the UE could determine whether the TCI field is present in the DCI or not based on the parameter of the scheduling CORESET in the first DL BWP regardless of the parameter of one or more CORESETs in the second DL BWP or configuration of the second DL BWP. Furthermore, after the UE decodes successfully the DCI, the UE may not truncate or pad zero-bits to the TCI field in the DCI based on the parameter of one or more CORESETs in the second DL BWP or based on configuration of the second DL BWP. Additionally, after the UE decodes the DCI successfully, the UE could switch active DL BWP from the first BWP to the second BWP, and the UE receives corresponding PDSCH in the second BWP.

In one embodiment, the UE truncates a field could mean that the UE only uses partial bits of the field in the DCI after the UE decodes successfully the DCI.

In one embodiment, the UE pads zero-bits to a field could mean that the UE prepends one or more zero-bits to the field in the DCI after the UE decodes successfully the DCI.

In one embodiment, a field size of the at least one field could be determined based on configuration of the first DL BWP before the UE decodes successfully the DCI. The field size of the at least one field determined based on configuration of the first DL BWP could be different from a field size of the at least one field determined based on configuration of the second DL BWP. If a field size of the at least one field determined in the second DL BWP is larger than a field size of the at least one field determined in the first DL BWP, the UE could pad zero-bits to the at least one field after the UE decodes successfully the DCI. Furthermore, if a field size of the at least one field determined in the second DL BWP is smaller than a field size of the at least one field determined in the first DL BWP, the UE could truncate the at least one field after the UE decodes successfully the DCI.

In one embodiment, the at least one field could be a frequency domain resource assignment field. The UE could receive the corresponding PDSCH on frequency domain resources, which is indicated by a frequency domain resource assignment field value with zero-bits padding or truncation performed based on configuration of the second DL BWP.

Referring back to FIGS. 3 and 4, in one exemplary embodiment of a UE configured with a first DL BWP and a second DL BWP the device 300 includes a program code 312 stored in the memory 310. The CPU 308 could execute program code 312 to enable the UE (i) to receive and/or monitor a DCI in a scheduling CORESET in the first DL BWP, and for determining size of the DCI for decoding, the UE determines that whether a TCI field is present in the DCI or not based on a parameter of the scheduling CORESET before the UE decodes the DCI successfully, (ii) to truncate or pad zero-bits to at least one field other than the TCI field in the DCI based on configuration of the second DL BWP after the UE decodes successfully the DCI, wherein a bandwidth part indicator field in the DCI indicates the second DL BWP different from the first DL BWP, and (iii) to determine whether the TCI field is present in the DCI or not based on the parameter of the scheduling CORESET in the first DL BWP after the UE decodes successfully the DCI, wherein a bandwidth part indicator field in the DCI indicates the second DL BWP different from the first DL BWP. Furthermore, the CPU 308 can execute the program code 312 to perform all of the above-described actions and steps or others described herein.

Figure 6:
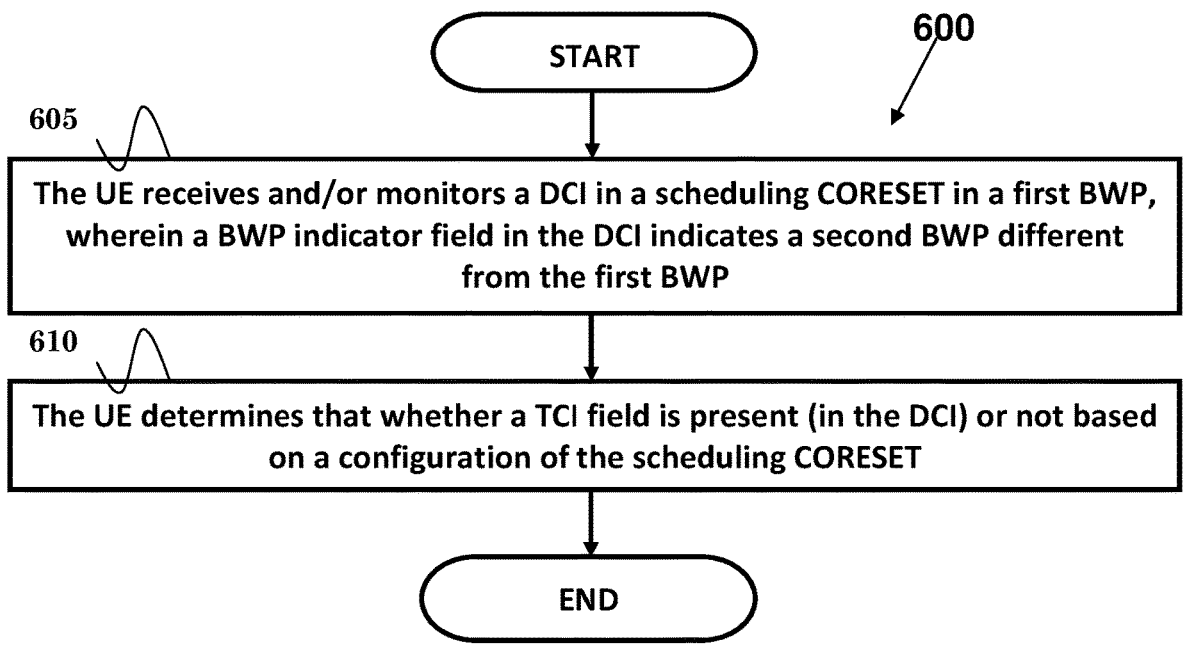
FIG. 6 is a flow chart according to one exemplary embodiment.

FIG. 6 is a flow chart 600 according to one exemplary embodiment from the perspective of a UE. In step 605, the UE receives and/or monitors a DCI in a scheduling CORE-SET in a first BWP, wherein a BWP indicator field in the DCI indicates a second BWP different from the first BWP. In step 610, the UE determines that whether a TCI field is present (in the DCI) or not based on a configuration of the scheduling CORESET.

In one embodiment, the configuration of the scheduling CORESET could be TCI-PresentInDCI. When the DCI does not comprise a TCI field, the UE could determine that the TCI field is not present (in the DCI). More specifically, when the DCI does not comprise a TCI field, the UE could determine that the TCI field is not present (in the DCI) regardless of configuration of one or more CORESETs in the second BWP enable TCI fields. In other words, when the DCI does not comprise a TCI field, the UE could determine that the TCI field is not present (in the DCI) regardless of TCI-PresentInDCI for one or more CORESETs in the second BWP is "Enabled".

On the other hand, when the DCI comprises a TCI field, the UE could determine that the TCI field is present (in the DCI) regardless of configuration of one or more CORESETs in the second BWP disable TCI fields. More specifically, when the DCI comprises a TCI field, the UE could determine that the TCI field is present (in the DCI) regardless of TCI-PresentInDCI for one or more CORESETs in the second BWP is "disabled".

In one embodiment, when the scheduling CORESET is configured with a TCI field, the DCI may comprise a TCI field. When TCI-PresentInDCI for the scheduling CORE-SET is "Enabled", the DCI may comprise a TCI field. The UE could receive scheduled PDSCH based on a TCI state. The TCI state could be explicitly or implicitly indicated by the TCI field in the DCI. The TCI state could be a TCI state configured or activated for receiving PDSCH or PDCCH transmitted in the first BWP and/or the second BWP.

In one embodiment, the TCI state could be identical to a TCI state applied for receiving the scheduling CORESET. When the TCI state is not explicitly or implicitly indicated by the TCI field, the UE may assume the TCI state is identical to a TCI state applied for the scheduling CORE-SET. More specifically, when the TCI state is not explicitly or implicitly indicated by the TCI field, the UE may assume the TCI state is identical to a TCI state applied for one of CORESET(s) in the second BWP, e.g. a CORESET with the lowest CORESET-ID in the latest slot in which one or more CORESETs within the second BWP are configured.

In one embodiment, the UE may assume that the antenna ports of one DM-RS port group of corresponding PDSCH of are quasi co-located with a reference signal in the RS set with respect to the QCL type parameter(s) given by the TCI state. Furthermore, the UE may receive corresponding PDSCH via antenna port quasi co-location information derived from the reference signal in the RS set with respect to the QCL type parameter(s) given by the TCI state. In one embodiment, the TCI state could be configured or activated for receiving PDSCH and/or PDCCH transmitted in the first BWP and/or the second BWP.

In one embodiment, the UE may be configured with a BWP indicator field. When the UE is configured with a BWP indicator field, DCI may comprise the BWP indicator field. When the BWP indicator field indicates a BWP different from (current) active BWP, the UE may switch from active BWP to the BWP indicated by the BWP indicator. When the BWP indicator field indicates a BWP the same as (current) active BWP, the UE may transmit or receive signals on (current) active BWP. The first BWP can be DL BWP or UL BWP. The second BWP can also be DL BWP or UL BWP. The DCI may refer to DCI format 1_0 or DCI format 0_0.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a DCI in a scheduling CORESET in a first BWP, wherein a BWP indicator field in the DCI indicates a second BWP different from the first BWP, and (ii) to determine that whether a TCI field is present (in the DCI) or not based on a configuration of the scheduling CORESET. Furthermore, the CPU 308 can execute the program code 312 to perform all of the above-described actions and steps or others described herein.

Figure 7:
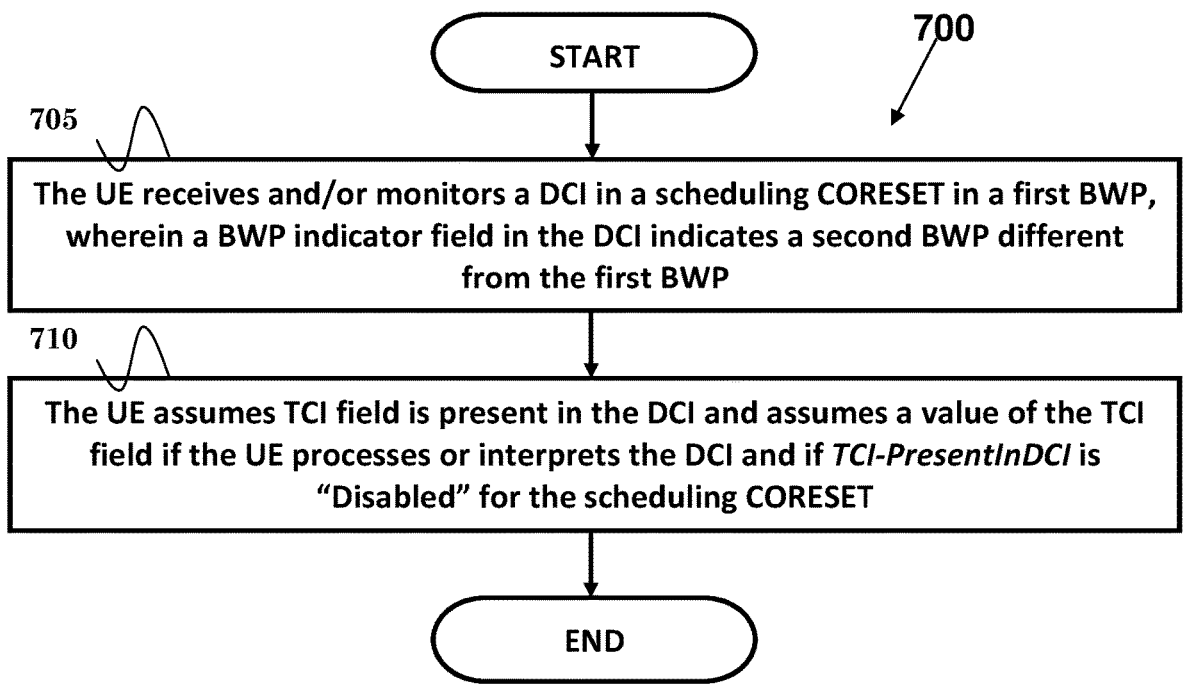
FIG. 7 is a flow chart according to one exemplary embodiment.

FIG. 7 is a flow chart 700 according to one exemplary embodiment from the perspective of a UE. In step 705, the UE receives and/or monitors a DCI in a scheduling CORE-SET in a first BWP, wherein a BWP indicator field in the DCI indicates a second BWP different from the first BWP. In step 710, the UE assumes TCI field is present in the DCI and assumes value of the TCI field if the UE processes or interprets the DCI and if TCI-PresentInDCI is "Disabled" for the scheduling CORESET.

In one embodiment, the UE may assume a TCI field is present and/or assume value of the TCI field e.g. assume value of the TCI field is "000" when the bit field is 3-bit length, regardless of TCI-PresentInDCI for the scheduling CORESET and/or TCI-PresentInDCI for one or more CORESET(s) in new BWP. Furthermore, the UE may assume the TCI field is present with zero-length and may pad zero bits to the TCI field to full length, e.g. pad zero bits to value "000" when the bit field is 3-bit length.

In one embodiment, when the TCI field is not present in the DCI, the UE assumes or uses a value of TCI field applied for receiving corresponding PDSCH (e.g. assume value of the TCI field is "000" or uses "000" when the bit field is 3-bit length). Furthermore, when TCI-PresentInDCI is "Disabled" for the scheduling CORESET and TCI-PresentInDCI for all CORESET(s) in new BWP is "Disabled", the UE may assume a value of the TCI field, e.g. assume value of the TCI field is "000" when the bit field is 3-bit length. When TCI-PresentInDCI is "Enabled" for the scheduling CORESET and TCI-PresentInDCI for all CORESET(s) in new BWP is "Disabled", the UE may interpret the DCI via truncating the TCI field in the DCI and may assume a value of TCI field, e.g. assume value of the TCI field is "000" when the bit field is 3-bit length.

In one embodiment, the UE could receive a scheduled PDSCH based on a TCI state. The TCI state could be explicitly or implicitly indicated by the TCI field. Furthermore, the TCI state could be a TCI state configured or activated for receiving PDSCH/PDCCH transmitted in the first BWP or the second BWP. Furthermore, the TCI state could be identical to a TCI state applied for receiving the scheduling CORESET. When the TCI state is not explicitly or implicitly indicated by the TCI field, the UE may assume the TCI state is identical to a TCI state applied for the scheduling CORESET. More specifically, when the TCI state is not explicitly or implicitly indicated by the TCI field, the UE may assume the TCI state is identical to a TCI state applied for one of CORESET(s) in the second BWP, e.g. a CORESET with the lowest CORESET-ID in the latest slot in which one or more CORESETs within the second BWP are configured.

In one embodiment, the UE may assume that the antenna ports of one DM-RS port group of corresponding PDSCH of are quasi co-located with a reference signal in the RS set with respect to the QCL type parameter(s) given by the TCI state. The UE may also receive corresponding PDSCH via antenna port quasi co-location information derived from the reference signal in the RS set with respect to the QCL type parameter(s) given by the TCI state. The TCI state could be configured or activated for receiving PDSCH and/or PDCCH transmitted in the first BWP or the second BWP.

In one embodiment, the UE may be configured with a BWP indicator field. When the UE is configured with a BWP indicator field, DCI may comprise the BWP indicator field. When the BWP indicator field indicates a BWP different from (current) active BWP, the UE may switch from active BWP to the BWP. When the BWP indicator field indicates a BWP the same as (current) active BWP, the UE may transmit or receive signals on (current) active BWP.

In one embodiment, the first BWP can be DL BWP or UL BWP. The second BWP can also be DL BWP or UL BWP. The DCI may refer to DCI format 1_0 or DCI format 0_0.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a DCI in a scheduling CORESET in a first BWP, wherein a BWP indicator field in the DCI indicates a second BWP different from the first BWP, and (ii) to assume TCI field is present in the DCI and assume value of the TCI field if the UE processes or interprets the DCI and if TCI-PresentInDCI is "Disabled" for the scheduling CORESET. Furthermore, the CPU 308 can execute the program code 312 to perform all of the above-described actions and steps or others described herein.

Figure 8:
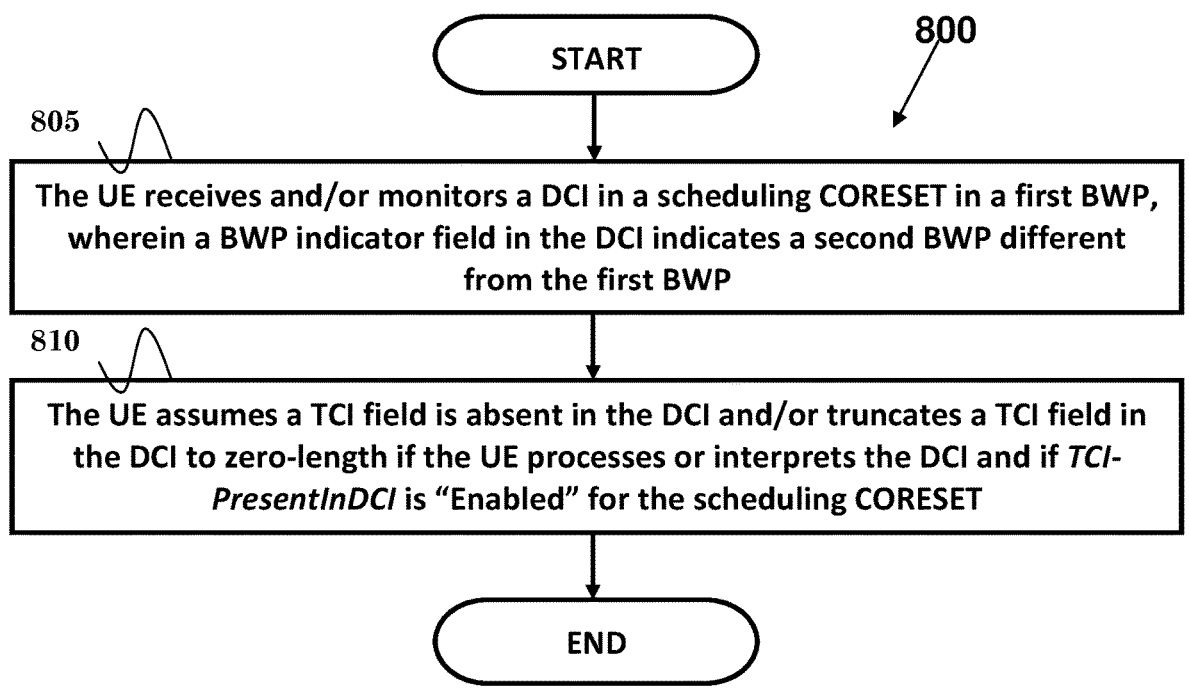
FIG. 8 is a flow chart according to one exemplary embodiment.

FIG. 8 is a flow chart 800 according to one exemplary embodiment from the perspective of a UE. In step 805, the UE receives and/or monitors a DCI in a scheduling CORESET in a first BWP, wherein a BWP indicator field in the DCI indicates a second BWP different from the first BWP. In step 810, the UE assumes a TCI field is absent in the DCI and/or truncates a TCI field in the DCI to zero-length if the UE processes or interprets the DCI and if TCI-PresentInDCI is "Enabled" for the scheduling CORESET.

In one embodiment, when or after the UE receives or decodes (successfully) the DCI, the UE may assume the TCI field is absent in the DCI and/or may assume a TCI field in the DCI is truncated to zero-length, regardless of TCI-PresentInDCI for the scheduling CORESET and/or TCI-PresentInDCI for one or more CORESET(s) in new BWP. If the TCI field is present in the DCI, the UE may discard, ignore, or not use the TCI field. The UE may not expect that TCI field in the DCI indicates value(s) of TCI field other than a specific value of TCI field (e.g. the UE may not expect that TCI field in the DCI indicates value(s) other than "000" when the bit field is 3-bit length).

In one embodiment, the UE could receive a scheduled PDSCH based on a TCI state. The TCI state could be explicitly or implicitly indicated by the TCI field. The TCI state could also be a TCI state configured or activated for receiving PDSCH or PDCCH transmitted in the first BWP or the second BWP. In addition, the TCI state could be identical to a TCI state applied for receiving the scheduling CORESET. When the TCI state is not explicitly or implicitly indicated by the TCI field, the UE may assume the TCI state is identical to a TCI state applied for the scheduling CORESET. When the TCI state is not explicitly or implicitly indicated by the TCI field, the UE may assume the TCI state is identical to a TCI state applied for one of CORESET(s) in the second BWP, e.g. a CORESET with the lowest CORESET-ID in the latest slot in which one or more CORESETs within the second BWP are configured.

In one embodiment, the UE may assume that the antenna ports of one DM-RS port group of corresponding PDSCH of are quasi co-located with a reference signal in the RS set with respect to the QCL type parameter(s) given by the TCI state. The UE may receive corresponding PDSCH via antenna port quasi co-location information derived from the reference signal in the RS set with respect to the QCL type parameter(s) given by the TCI state. The TCI state could be configured or activated for receiving PDSCH and/or PDCCH transmitted in the first BWP or the second BWP.

In one embodiment, the UE may be configured with a BWP indicator field. When the UE is configured with a BWP indicator field, DCI may comprise the BWP indicator field. When the BWP indicator field indicates a BWP different from (current) active BWP, the UE may switch from active BWP to the BWP. When the BWP indicator field indicates a BWP the same as (current) active BWP, the UE may transmit or receive signals on (current) active BWP. The first BWP can be DL BWP or UL BWP. The second BWP can also be DL BWP or UL BWP. The DCI may refer to DCI format 1_0 or DCI format 0_0.

Referring back to FIGS. 3 and 4, in one exemplary embodiment of a UE, the device 300 includes a program code 312 stored in the memory 310. The CPU 308 could execute program code 312 to enable the UE (i) to receive and/or monitor a DCI in a scheduling CORESET in a first BWP, wherein a BWP indicator field in the DCI indicates a second BWP different from the first BWP, and (ii) to assume a TCI field is absent in the DCI and/or truncate a TCI field in the DCI to zero-length if the UE processes or interprets the DCI and if TCI-PresentInDCI is "Enabled" for the scheduling CORESET. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:
1. A method of a UE (User Equipment), comprising:
the UE is configured with a first DL (Downlink) BWP (Bandwidth Part) and a second DL BWP, wherein more than one CORESETs (Control Resource Set) are configured in the second DL BWP and the more than one CORESETs comprise a first CORESET with a TCI (Transmission Configuration Indication) field absence in DCI (Downlink Control Information) and the more than one CORESETs comprise a second CORESET with a TCI field presence in DCI;

the UE receives and/or monitors a DCI in a scheduling CORESET in the first DL BWP, and for determining size of the DCI for decoding, the UE determines whether the TCI field is present in the DCI or not based on a parameter of the scheduling CORESET in the first DL BWP before the UE decodes the DCI successfully;

after the UE decodes successfully the DCI, the UE truncates or pads zero-bits to at least one field, other than the TCI field, in the DCI based on configuration of the second DL BWP, and the UE determines whether the TCI field is present in the DCI or not based on the parameter of the scheduling CORESET in the first DL BWP, wherein a BWP indicator field in the DCI indicates the second DL BWP different from the first DL BWP and the second DL BWP comprises the first CORESET with TCI field absence in DCI and the second CORESET with TCI field present in DCI, and TCI bit field size of the first CORESET is different than the TCI bit field size of the second CORESET for the second DL BWP; and the UE receives a corresponding PDSCH (Physical Downlink Shared Channel), scheduled by the DCI, in the second DL BWP.

2. The method of claim 1, wherein the parameter is TCI-PresentInDCI.

3. The method of claim 1, further comprising:
the UE receives the corresponding PDSCH based on a TCI state indicated by the TCI field in the DCI when the TCI field is determined to be present in the DCI, wherein the TCI state is configured and/or activated for receiving PDSCH transmitted in the second DL BWP.

4. The method of claim 3, further comprising:
the UE receives the corresponding PDSCH via antenna port quasi co-location information derived from a reference signal in a RS (Reference Symbol) set with respect to a QCL (Quasi Co-Location) type parameter(s) given by the TCI state.

5. The method of claim 1, further comprising:
after the UE decodes successfully the DCI, the UE determines that whether the TCI field is present in the DCI or not based on the parameter of the scheduling CORESET in the first DL BWP regardless of the parameter of one or more CORESETs in the second DL BWP or configuration of the second DL BWP.

6. The method of claim 1, further comprising:
after the UE decodes successfully the DCI, the UE does not truncate or pad zero-bits to the TCI field in the DCI based on the parameter of one or more CORESETs in the second DL BWP or based on configuration of the second DL BWP.

7. The method of claim 1, wherein the UE truncates a field means that the UE only uses partial bits of the field in the DCI after the UE decodes successfully the DCI.

8. The method of claim 1, wherein the UE pads zero-bits to a field means that the UE prepends one or more zero-bits to the field in the DCI after the UE decodes successfully the DCI.

9. The method of claim 1, wherein a field size of the at least one field is determined based on configuration of the first DL BWP before the UE decodes successfully the DCI.

10. The method of claim 1, wherein a field size of the at least one field which is determined based on configuration of the first DL BWP is different from a field size of the at least one field which is determined based on configuration of the second DL BWP.

11. The method of claim 1, further comprising:
the UE pads zero-bits to the at least one field after the UE decodes successfully the DCI if a field size of the at least one field determined based on configuration of the second DL BWP is larger than a field size of the at least one field determined based on configuration of the first DL BWP; and the UE truncates the at least one field after the UE decodes successfully the DCI if a field size of the at least one field determined based on configuration of the second DL BWP is smaller than a field size of the at least one field determined based on configuration of the first DL BWP.

12. The method of claim 1, wherein the at least one field is frequency domain resource assignment field, and the UE receives the corresponding PDSCH on frequency domain resources, which is indicated by a frequency domain resource assignment field value with zero-bits padding or truncation performed based on configuration of the second DL BWP.

13. The method of claim 1, further comprising:
the UE does not truncate or pad zero-bits to the TCI field when a field size of the TCI field, based on the determination of whether the TCI field is present in the DCI after decoding the DCI successfully, is the same as or is not different than a field size of the TCI field, based on the determination of whether the TCI field is present in the DCI before decoding the DCI successfully.

14. A method of a UE (User Equipment), comprising:
receiving configuration for configuring the UE with a first DL (Downlink) BWP (Bandwidth Part) and a second DL BWP, wherein a plurality of CORESETs (Control Resource Set) are configured in the second DL BWP and the plurality of CORESETs comprise a first CORESET with a TCI (Transmission Configuration Indication) field absence in DCI (Downlink Control Information) and a second CORESET with a TCI field presence in DCI;

receiving and/or monitoring a DCI in a scheduling CORESET in the first DL BWP, and for determining size of the DCI for decoding;

determining whether the TCI field is present in the DCI or not based on a parameter of the scheduling CORESET in the first DL BWP before the UE decodes the DCI successfully;

truncating or padding zero-bits, after the UE decodes successfully the DCI, to at least one field, other than the TCI field, in the DCI based on configuration of the second DL BWP, and determining whether the TCI field is present in the DCI or not based on the parameter of the scheduling CORESET in the first DL BWP, wherein a BWP indicator field in the DCI indicates the second DL BWP different from the first DL BWP and the second DL BWP comprises the first CORESET with TCI field absence in DCI and the second CORESET with TCI field present in DCI, and TCI bit field size of the first CORESET is different than the TCI bit field size of the second CORESET for the second DL BWP; and receiving a corresponding PDSCH (Physical Downlink Shared Channel), scheduled by the DCI, in the second DL BWP.

15. The method of claim 14, further comprising:
receiving the corresponding PDSCH based on a TCI state indicated by the TCI field in the DCI when the TCI field is determined to be present in the DCI, wherein the TCI state is configured and/or activated for receiving PDSCH transmitted in the second DL BWP.

16. The method of claim 15, further comprising:
receiving the corresponding PDSCH via antenna port quasi co-location information derived from a reference signal in a RS (Reference Symbol) set with respect to a QCL (Quasi Co-Location) type parameter(s) given by the TCI state.

17. The method of claim 14, further comprising:
determining, after successfully decoding the DCI, whether the TCI field is present in the DCI or not based on the parameter of the scheduling CORESET in the first DL BWP regardless of the parameter of the plurality of CORESETs in the second DL BWP or configuration of the second DL BWP.

18. The method of claim 14, further comprising:
not truncating or padding zero-bits, after successfully decoding the DCI, to the TCI field in the DCI based on the parameter of the plurality of CORESETs in the second DL BWP or based on configuration of the second DL BWP.

19. The method of claim 14, further comprising:
not truncating or padding zero-bits to the TCI field when a field size of the TCI field, based on determining whether the TCI field is present in the DCI after decoding the DCI successfully, is the same as or is not different than a field size of the TCI field, based on the determination of whether the TCI field is present in the DCI before decoding the DCI successfully.

20. The method of claim 14, wherein a field size of the at least one field which is determined based on configuration of the first DL BWP before the UE decodes successfully the DCI, or a field size of the at least one field which is determined based on configuration of the first DL BWP is different from a field size of the at least one field which is determined based on configuration of the second DL BWP.

* * * * *